United States Patent
Aoyama et al.

(10) Patent No.: US 10,727,727 B2
(45) Date of Patent: Jul. 28, 2020

(54) LINEAR MOTOR AND APPARATUS USING SAME

(71) Applicant: Hitachi, Ltd., Chiyoda-ku, Tokyo (JP)

(72) Inventors: Yasuaki Aoyama, Tokyo (JP); Masaki Koyama, Tokyo (JP); Takahiro Suzuki, Tokyo (JP); Shuhei Nagata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 469 days.

(21) Appl. No.: 15/305,935

(22) PCT Filed: Mar. 2, 2015

(86) PCT No.: PCT/JP2015/056026
§ 371 (c)(1),
(2) Date: Oct. 21, 2016

(87) PCT Pub. No.: WO2015/163007
PCT Pub. Date: Oct. 29, 2015

(65) Prior Publication Data
US 2017/0054355 A1 Feb. 23, 2017

(30) Foreign Application Priority Data
Apr. 23, 2014 (JP) .................. 2014-088700

(51) Int. Cl.
*H02K 41/02* (2006.01)
*H02K 41/03* (2006.01)
*H02K 16/02* (2006.01)

(52) U.S. Cl.
CPC ............. *H02K 41/02* (2013.01); *H02K 16/02* (2013.01); *H02K 41/031* (2013.01)

(58) Field of Classification Search
CPC ....... H02K 16/00–16/04; H02K 41/00–41/065
See application file for complete search history.

(56) References Cited

U.S. PATENT DOCUMENTS

2006/0012252 A1   1/2006   Miyata et al.
2011/0248579 A1  10/2011   Aoyama
2013/0093264 A1   4/2013   Aoyama et al.

FOREIGN PATENT DOCUMENTS

JP   2005-287185 A   10/2005
JP    2006-34013 A    2/2006
(Continued)

OTHER PUBLICATIONS

International Search Report (PCT/ISA/210) issued in PCT Application No. PCT/JP2015/056026 dated May 19, 2015 with English-language translation (five (5) pages).
(Continued)

*Primary Examiner* — Ramon M Barrera
(74) *Attorney, Agent, or Firm* — Crowell & Moring LLP

(57) ABSTRACT

Provided are: a linear motor that has increased compactness and that can effectively use magnetic flux; and an apparatus provided with the linear motor. The linear motor has a top mobile element and a bottom mobile element provided below the top mobile element, and an armature has: a top first set of magnetic pole teeth comprising two magnetic pole teeth opposing each other in the vertical direction across a space through which the top mobile element can move in a reciprocating manner; and a bottom first set of magnetic pole teeth comprising two magnetic pole teeth opposing each other in the vertical direction across a space through which the bottom mobile element can move in a reciprocating manner. The linear motor is characterized by the armature being able to be split into an inner component, which has the bottom magnetic pole tooth of the top first set of magnetic pole teeth and the top magnetic pole tooth of the bottom first set of magnetic pole teeth, and a component having approximately the same shape as that of the inner component or outer component and having the bottom (Continued)

magnetic pole tooth of the bottom first set of magnetic pole teeth.

6 Claims, 34 Drawing Sheets

(56) References Cited

FOREIGN PATENT DOCUMENTS

| JP | 2011-223697 A | 11/2011 |
| WO | WO 2011/154995 A1 | 12/2011 |
| WO | WO 2013/022402 A1 | 2/2013 |

OTHER PUBLICATIONS

Japanese-language Written Opinion (PCT/ISA/237) issued in PCT Application No. PCT/JP2015/056026 dated May 19, 2015 (four (4) pages).

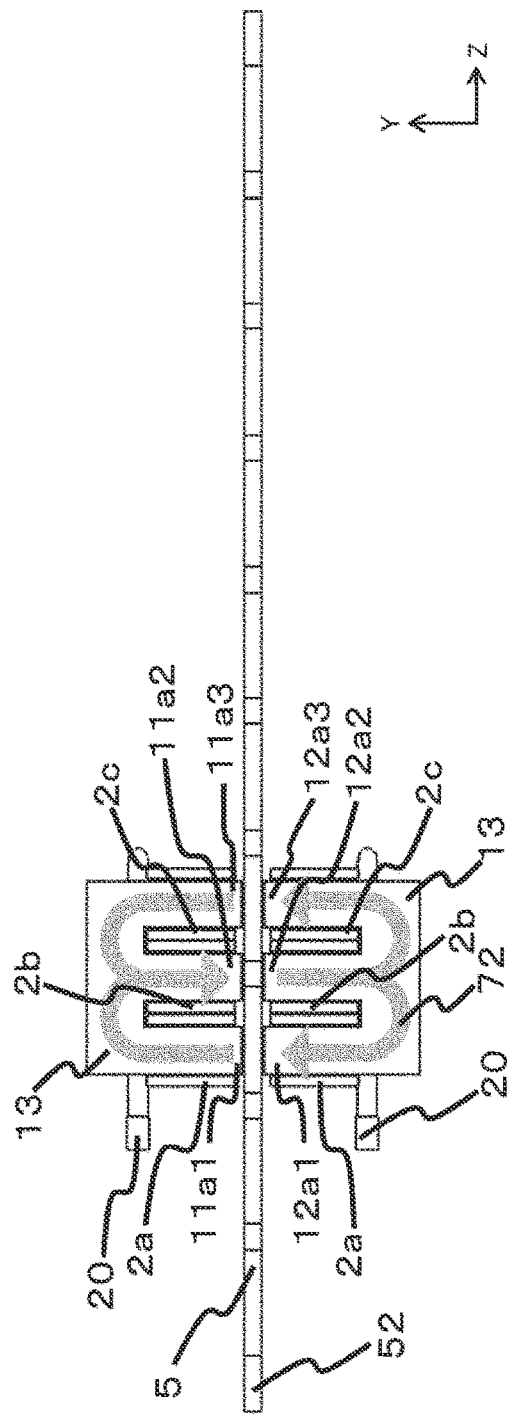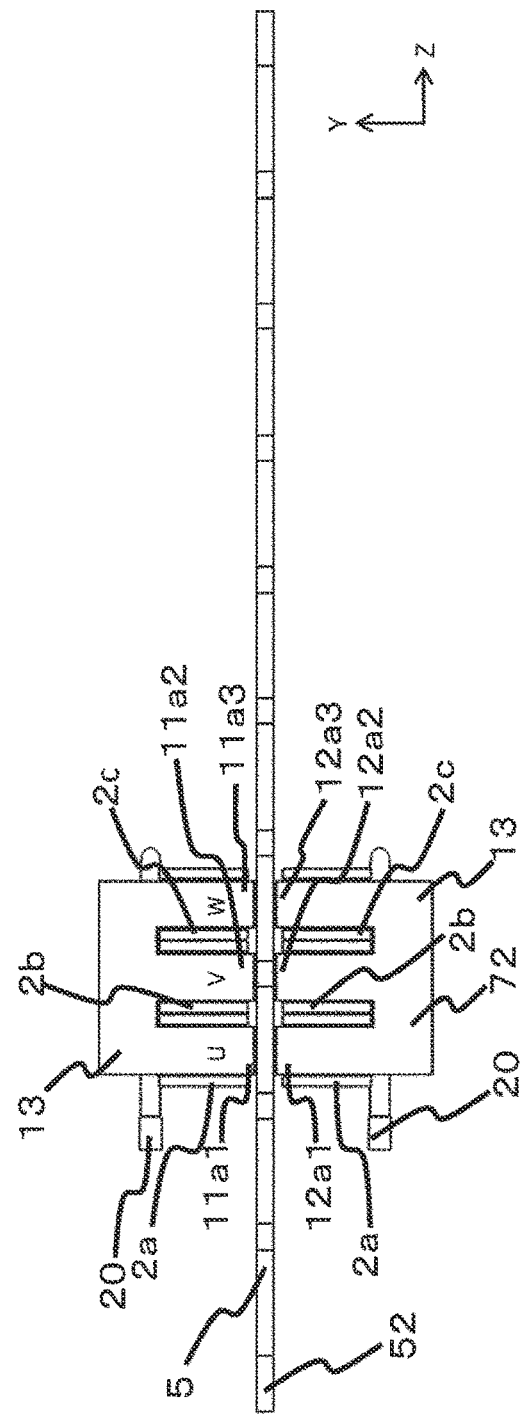

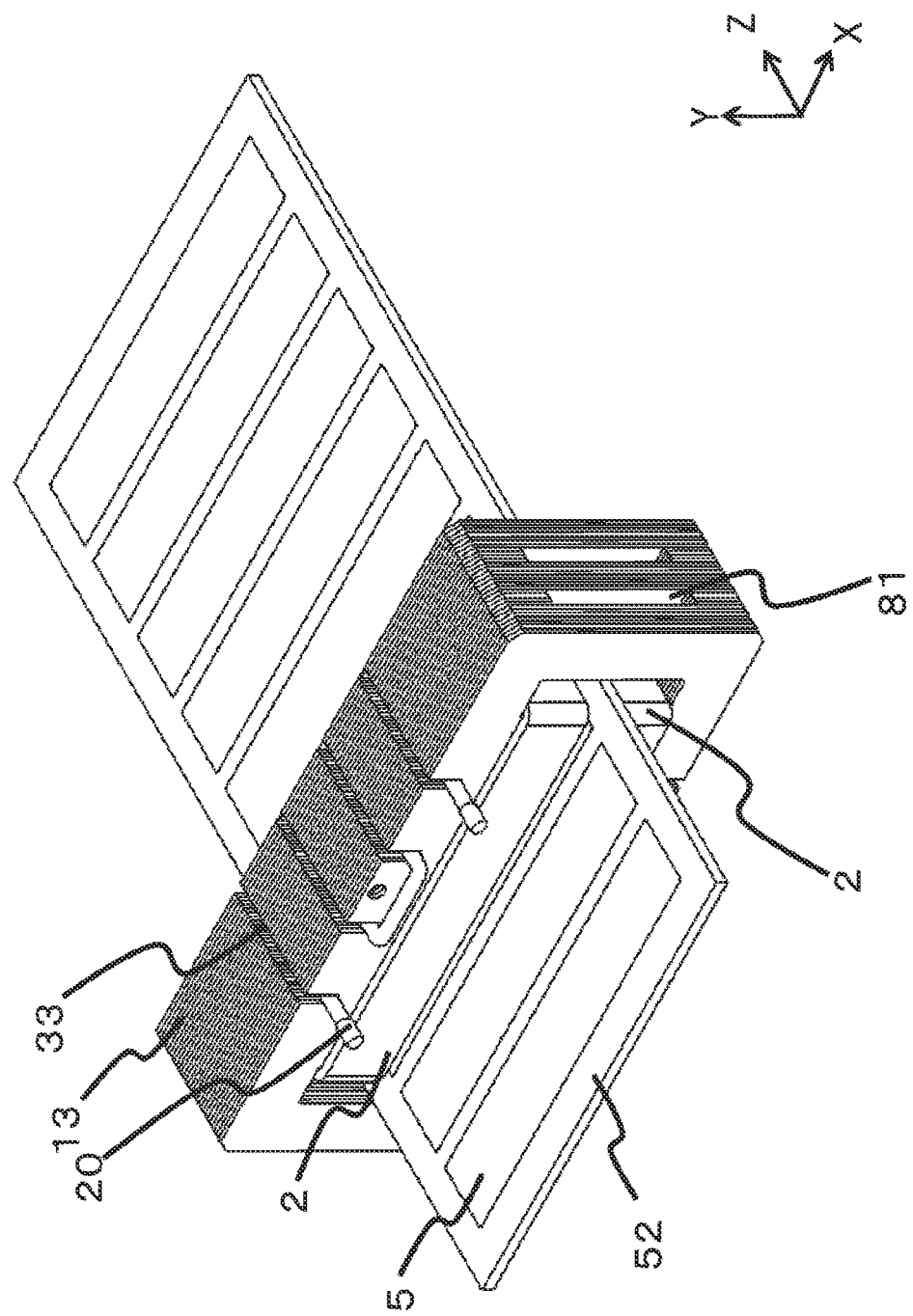

LINEAR MOTOR AND APPARATUS USING SAME

TECHNICAL FIELD

The present invention relates to a linear motor and an apparatus using the linear motor.

BACKGROUND ART

PTL 1 and PTL 2 disclose a linear motor which generates thrust to relatively horizontally move between a permanent magnet of a moving element and an armature.

PTL 1 discloses a configuration in which a magnetic pole includes magnetic pole teeth disposed opposite to each other via a space and a magnetic material connecting the magnetic pole teeth, a plurality of the magnetic poles are included in a moving direction of a moving element, and magnetic fluxes generated by windings disposed to an armature have a same polarity in a plurality of the magnetic poles.

PTL 2 discloses a linear motor including windings wound around a plurality of magnetic poles (corresponding to a magnetic pole tooth according to the present invention, for example, refer to FIGS. 1 and 12 in PTL 2) and including a plurality of moving elements (FIG. 14). Further, PTL 2 discloses cores which can be divided in an arrangement direction of moving elements and laminated in a moving direction of the moving elements (0047, 0049, FIGS. 7 and 9). Furthermore, PTL 2 discloses that a dimension in a height direction can be reduced in the case where a plurality of moving elements are included (0069, FIG. 17(b)).

CITATION LIST

Patent Literatures

PTL 1: JP 2011-223697 A
PTL 2: WO 2011/154995 A1

SUMMARY OF INVENTION

Technical Problem

A configuration of PTL 1 is a linear motor mainly using a magnetic flux in a surface orthogonal to a moving direction of a moving element. When magnetic poles adjacent in the moving direction of the moving element are opposite to each other, leakage of a magnetic flux is caused in the moving direction of the moving element, and a thrust efficiency is reduced. Therefore, in PTL 1, to reduce the leakage, adjacent multiple magnetic poles 3 have a same polarity (0024). In the case where leakage of a magnetic flux is suppressed by the above-described configuration, an interval of magnetic poles having the same polarity is increased, and an apparatus size is increased.

According to the configuration described in PTL 2, by forming a magnetic pole by laminated cores, for example, an eddy current loss caused by a magnetic flux moving in the X direction in FIG. 9 is reduced. However, in PTL 2, a driving unit in which windings wind around a plurality of magnetic poles, and to effectively use the magnetic flux, the magnetic pole partially has a tapered shape in a part which is not in contact with the windings, and is tapered toward a permanent magnet. Therefore, shapes of laminated plates for forming a laminated core are varied, and types of parts and assemblability need to be improved (refer to FIG. 13). Further, in the case where the laminated core is used, a fixing means is needed to prevent decomposition of the laminated core. However, PTL 2 does not disclose such means. Especially, PTL 2 does not disclose, for example, how each of core parts on an upper side, a middle and a lower side is fixed in the case where the core can be divided in a vertical direction (refer to FIG. 17(b)). In PTL 2, windings are wound around a plurality of magnetic poles. Therefore, an apparatus size is increased as in PTL 1.

The present is in view of the above-described points, and one of the objects of the present invention is to provide a downsized linear motor which can effectively use a magnetic flux, and an apparatus using the linear motor.

Solution to Problem

To achieve the above object, a linear motor according to the present invention includes an upper moving element which relatively moves in a longitudinal direction with respect to an armature and a lower moving element provided lower than the upper moving element, wherein the armature includes: an upper first magnetic pole tooth pair including two magnetic pole teeth disposed opposite to each other in a vertical direction via a space in which the upper moving element can relatively move; and a lower first magnetic pole tooth pair including two magnetic pole teeth disposed opposite to each other in a vertical direction via a space in which the lower moving element can relatively move, wherein the armature includes: outside parts including an upper magnetic pole tooth of the upper first magnetic pole tooth pair; inside parts including a lower magnetic pole tooth of the upper first magnetic pole tooth pair and an upper magnetic pole tooth of the lower first magnetic pole tooth pair; and a lower magnetic pole tooth of the lower first magnetic pole tooth pair, and the armature can be divided into parts having substantially same shapes with the outside parts or the inside parts.

Advantageous Effects of Invention

According to the present invention, a downsized linear motor which can effectively use a magnetic flux, and an apparatus using the linear motor.

BRIEF DESCRIPTION OF DRAWINGS

FIG. 2 is a perspective view illustrating a cross section on the Y-Z plane in

FIG. 1.

FIGS. 20A and 20B are YZ sectional views of FIG. 19 and views describing a second path of a magnetic flux.

FIG. 27 is a view illustrating an example of a linear motor in which members forming a magnetic material are laminated in a moving direction of a moving element.

DESCRIPTION OF EMBODIMENTS

Figure 1:
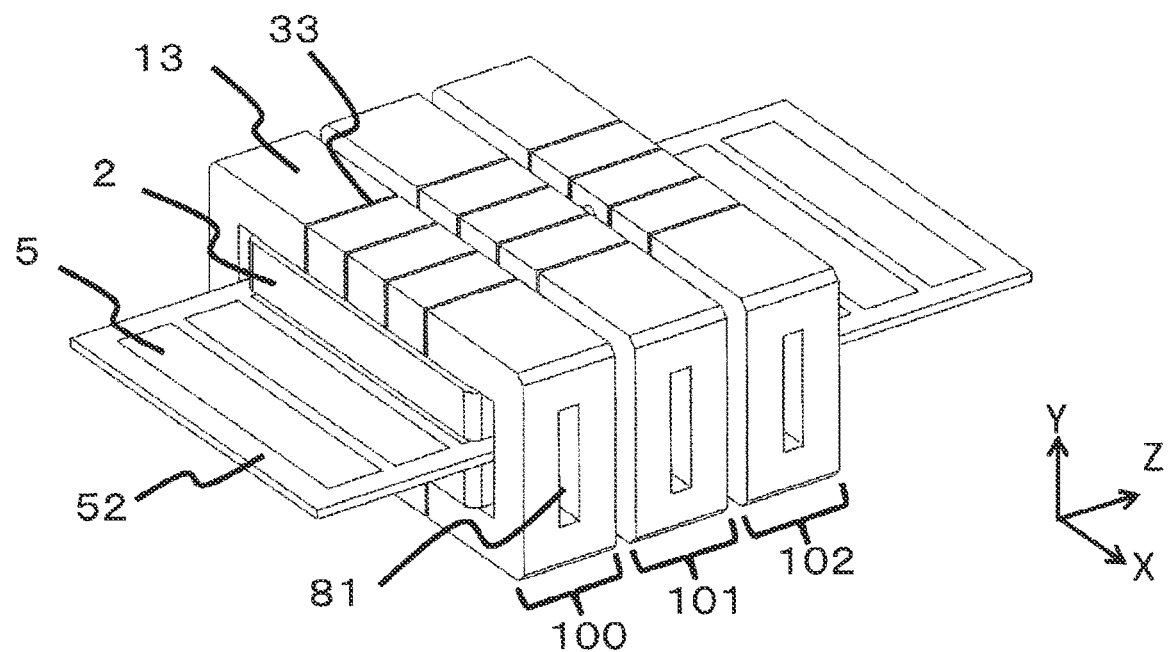
FIG. 1 is a perspective view of a linear motor according to a first embodiment.
Figure 2:
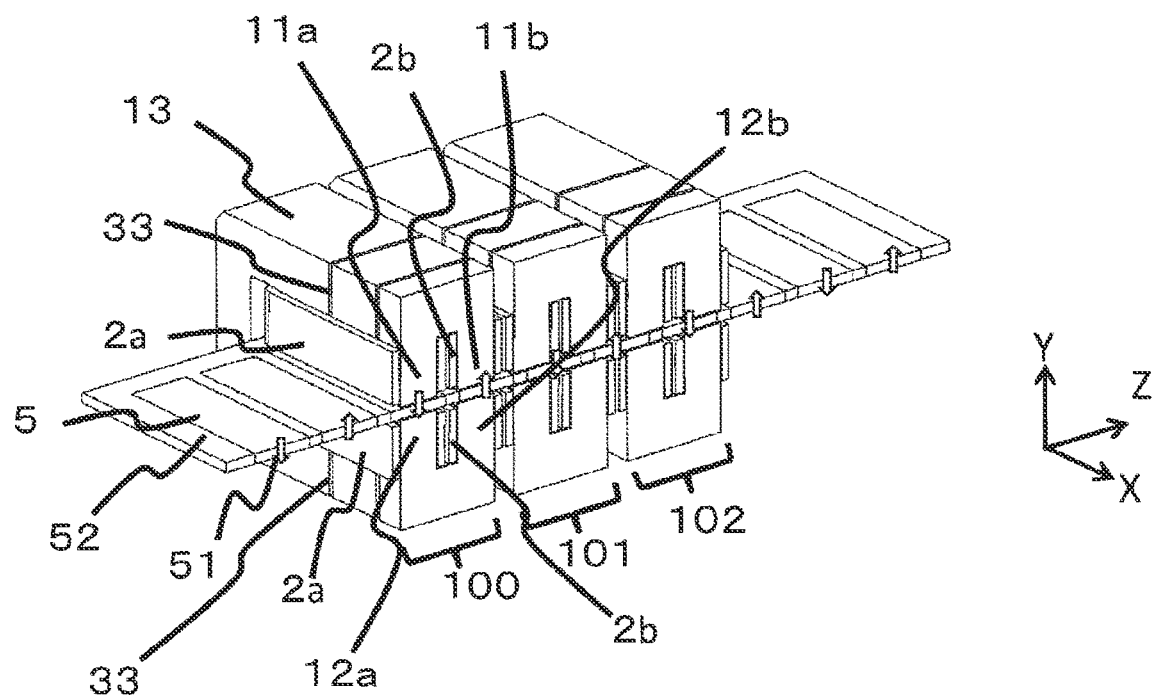
Figure 3:
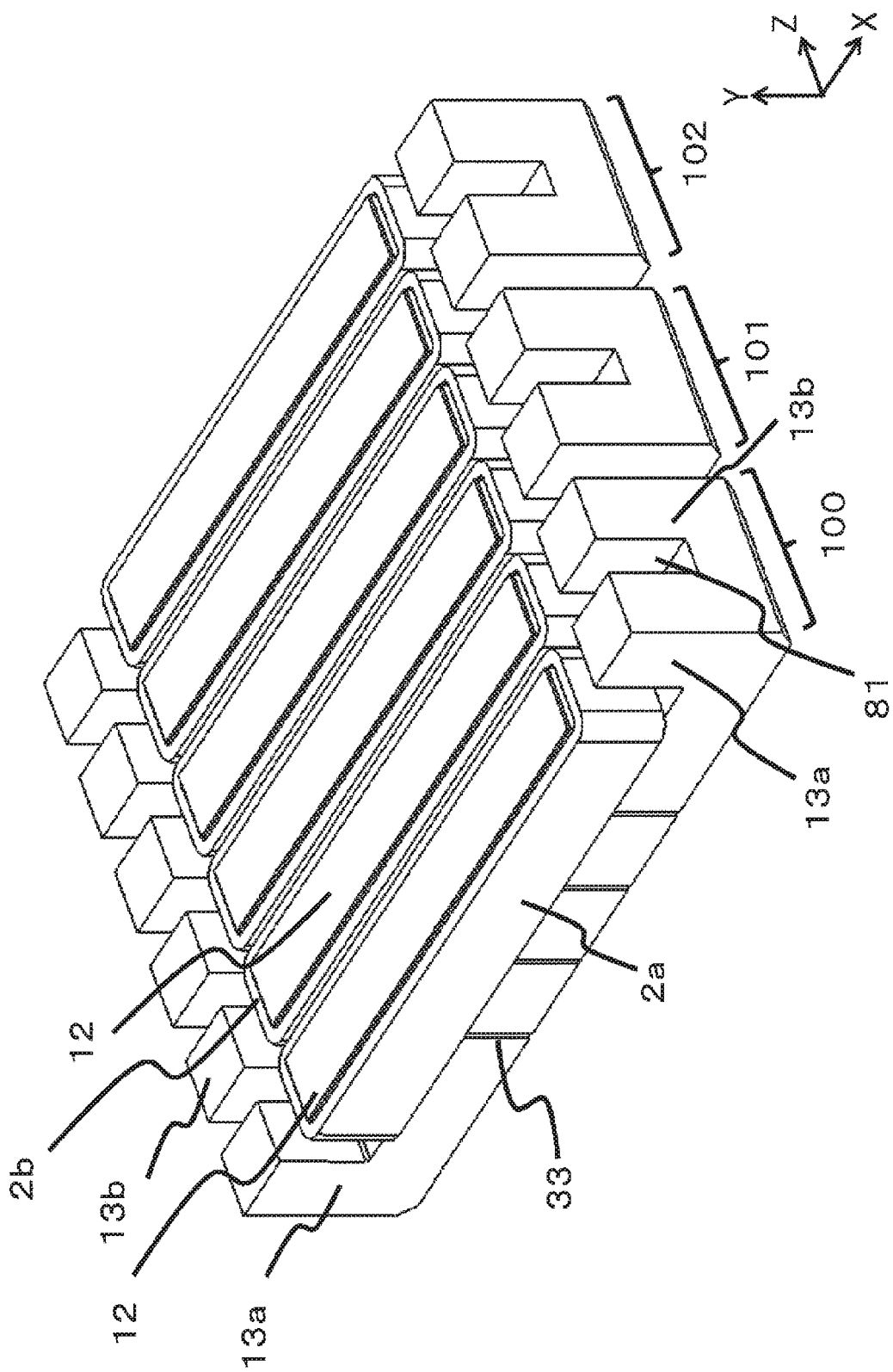
FIG. 3 is a perspective cross-sectional view on the X-Z plane in FIG. 1 on which a permanent magnet is omitted.

With reference to attached drawings, embodiments of a linear motor according the present invention and an apparatus using the linear motor will be described below. In each embodiment, same components are denoted by same reference signs, and similar descriptions are not repeated. Each component in the present invention is not necessarily independently arranged. Multiple components may be formed as one member, one component may be formed by a plurality of members, a component may be a part of another component, and a part of a component and a part of another component may be overlapped.

First Embodiment

<Overall Configuration of Linear Motor>

With reference to FIGS. 1 to 13, a linear motor according to a first embodiment will be described. Hereinafter, X, Y, and Z directions indicate directions as indicated in the drawings. Further, in the case where the X direction, the Y direction, and the Z direction are respectively called a lateral direction, a vertical direction, and a longitudinal direction, the vertical direction is not necessarily parallel with the gravity direction. For example, the lateral direction, the longitudinal direction, and the other directions may be in parallel with the gravity direction.

In the first embodiment, a three-phase motor is formed, and a stator includes three armatures 100, 101, and 102. Unless otherwise noted, the armatures 101 and 102 can have a same configuration as with the armature 100. In the embodiment, although magnetic directions 51 of adjacent permanent magnets 5 are opposite each other, the magnetic directions 51 may be opposite for each of a plurality of the permanent magnets 5. In the linear motor, moving elements including a plurality of permanent magnets 5 held by a permanent magnet holding member relatively linearly move (horizontally move) in a longitudinal direction with the armature 100. A three-phase linear motor can be formed by disposing three armatures 100, 101, and 102 such that each of the phases is electrically shifted at 120°. Similarly, m armatures form a m-phase driving linear motor.

The permanent magnet 5 is fixed to the permanent magnet holding member 52 holding the permanent magnet 5, and the permanent magnet 5 and the permanent magnet holding member 52 form a moving element. The moving element and a stator are held by a supporting means capable of a relative linear movement. The moving element and the stator at least relatively move, and it is possible to move a stator (armature) side by fixing the moving element. Further, the moving element according to the embodiment has a plane shape with a predetermined width in a lateral direction.

In the armatures 100, two magnetic pole tooth pairs including two magnetic pole teeth 11 and 12 disposed opposite to each other via a space in a vertical direction are adjacently arranged in a longitudinal direction. Specifically, the armature 100 includes a first magnetic pole tooth pair and a second magnetic pole tooth pair. The first magnetic pole tooth pair includes an upper magnetic pole tooth 11a and a lower magnetic pole tooth 12a disposed opposite to each other via a space in a vertical direction. The second magnetic pole tooth pair includes an upper magnetic pole tooth 11b and a lower magnetic pole tooth 12b. The first magnetic pole tooth pair and the second magnetic pole tooth pair are arranged in a longitudinal direction. The upper magnetic pole tooth 11a and the lower magnetic pole tooth 12a of the first magnetic pole tooth pair are connected by a magnetic material 13, and a magnetic circuit is formed. Similarly, the upper magnetic pole tooth 11b and the lower magnetic pole tooth 12b of the second magnetic pole tooth pair are connected by the magnetic material 13, and a magnetic circuit is formed. In addition, the first magnetic pole tooth pair and the second magnetic pole tooth pair are connected by the magnetic material 13, and a magnetic circuit is formed. In other words, a magnetic circuit is formed which includes the upper magnetic pole tooth 11a and the lower magnetic pole tooth 12a of the first magnetic pole tooth pair, the upper magnetic pole tooth 11b and the lower magnetic pole tooth 12b of the second magnetic pole tooth pair, and the magnetic material 13. Accordingly, a three-dimensional magnetic circuit to be described later is formed. The magnetic material 13 at least can form a magnetic circuit by forming a path through which a magnetic flux passes, and the magnetic material 13 is not necessarily integrated. Further, in the magnetic material 13 connecting magnetic pole teeth, the entire magnetic material is not necessarily a magnetic material. The magnetic material 13 at least can form a magnet circuit by forming a path through which a magnetic flux passes.

Each of the magnetic pole teeth 11 and 12 has a flat shape with a substantially same vertical. Each of the magnetic pole teeth 11 and 12 has a flat shape with substantially same vertical dimension. Therefore, preferably, a winding 2 can be easily wound around and fixed to each magnetic pole tooth, and also an armature can be easily formed by lamination of electromagnetic steel sheets. As illustrated in a sectional view in FIG. 2, the armature 100 according to the embodiment has a shape such that two substantial "recessed" magnetic materials are disposed opposite to each other.

A first winding 2a which is an exciting means is wound around each magnetic pole tooth of the first magnetic pole tooth pair. Similarly, a second winding 2b which is an exciting means is wound around each magnetic pole tooth of the second magnetic pole tooth pair. Both of two magnetic pole teeth of the magnetic pole tooth pairs according to the embodiment include windings, and the winding may be included in either one. A moving element including the permanent magnet 5 and a stator including the magnetic material 13 relatively move through a space in which the upper magnetic pole tooth 11 and the lower magnetic pole tooth 12 are disposed opposite to each other.

<Path of Magnetic Flux>

Figure 4:
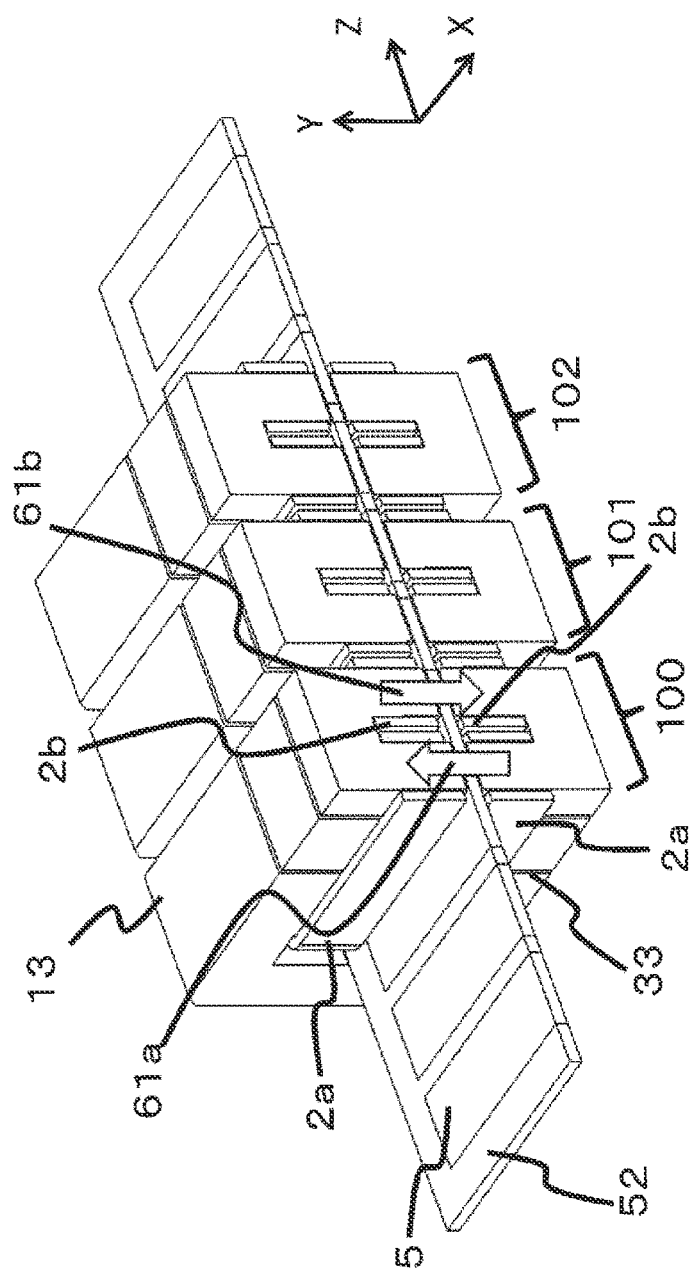
FIG. 4 is a perspective view illustrating a cross section on the plan: Y-Z of the linear motor according to the first embodiment indicating a direction of a magnetic flux generated in a space of an upper magnetic pole tooth and a lower magnetic pole tooth.

A direction of a magnetic flux formed by the first winding 2a and the second winding 2b in a space between the first magnetic pole tooth pair and a space between the second magnetic pole tooth pairs is indicated by a white arrow in FIG. 4 (generally, a linear motor temporally changes a size and a direction of a current flowed in a winding depending on a position of a permanent magnet. FIG. 4 indicates a magnetic flux formed in a space by a current flowed in the first winding 2a and the second winding 2b at a certain time).

As indicated by the white arrow in FIG. 4, at a certain time, the first winding 2a generates an upward magnetic flux 61a, and the second winding 2b generates a downward magnetic flux 61b. Specifically, in the armature 100, directions of the magnetic fluxes generated by the first winding 2a and the second winding 2b adjacent in a longitudinal direction are opposite each other.

Figure 5:
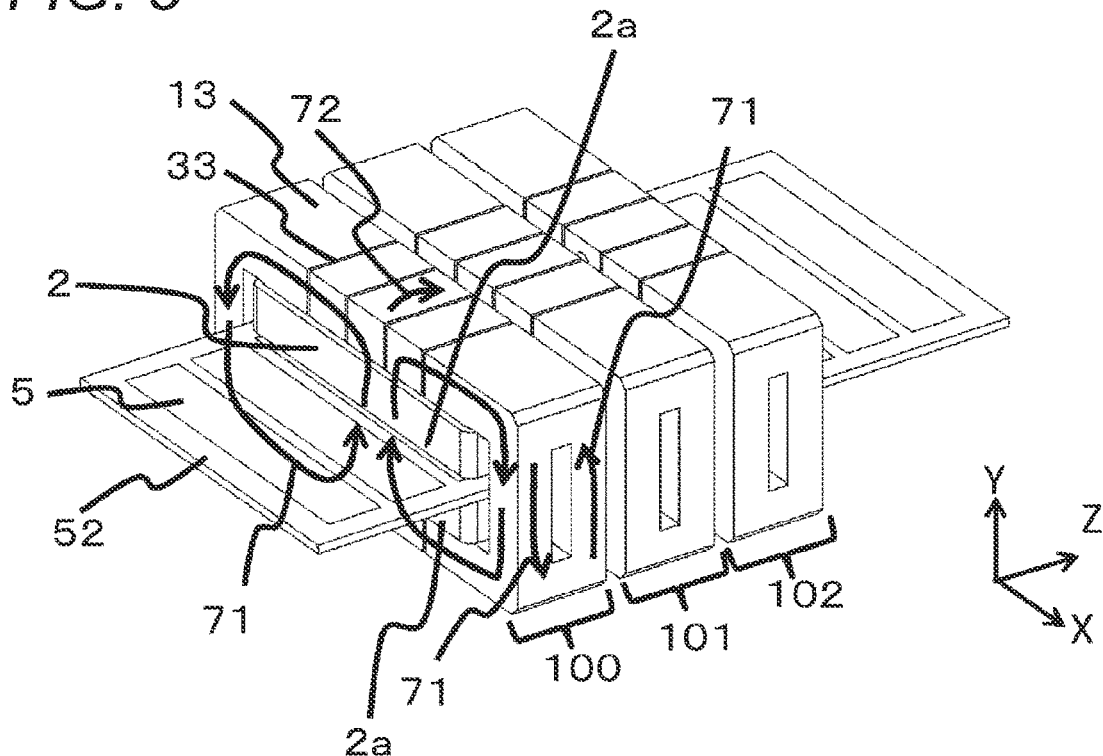
FIG. 5 is a perspective cross-sectional view on the Y-Z plane in FIG. 5.
Figure 6:
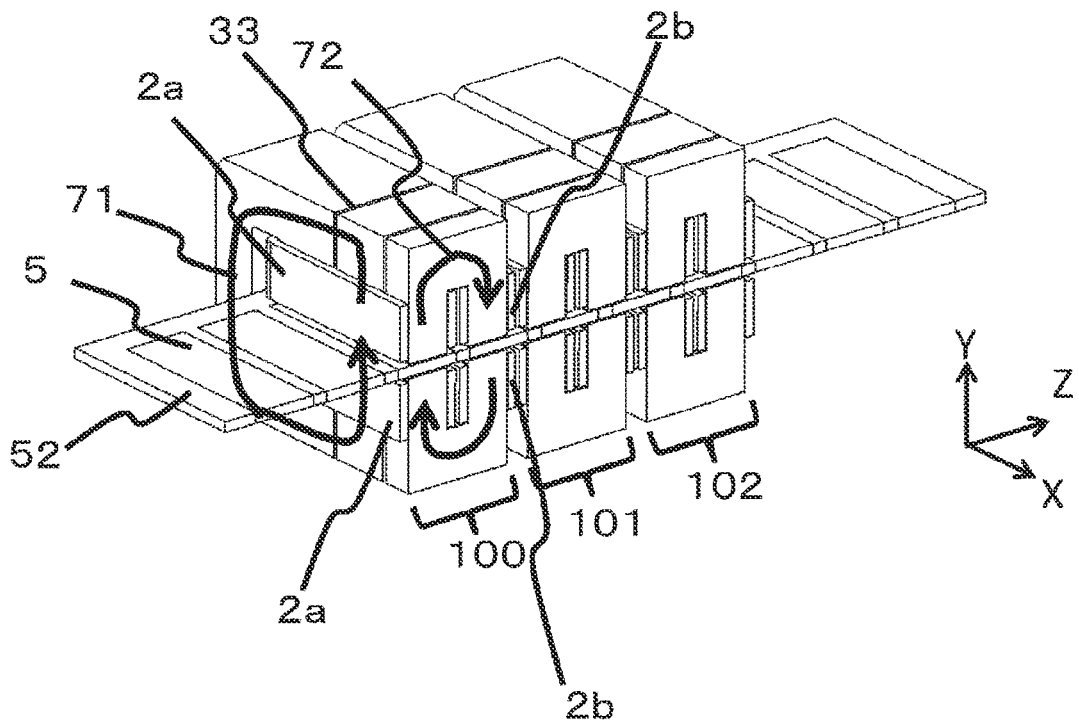
FIG. 6 is a perspective view illustrating a cross section on the Y-Z plane indicating a first magnetic flux path and a second magnetic flux path of the linear motor according to the first embodiment.
Figure 7:
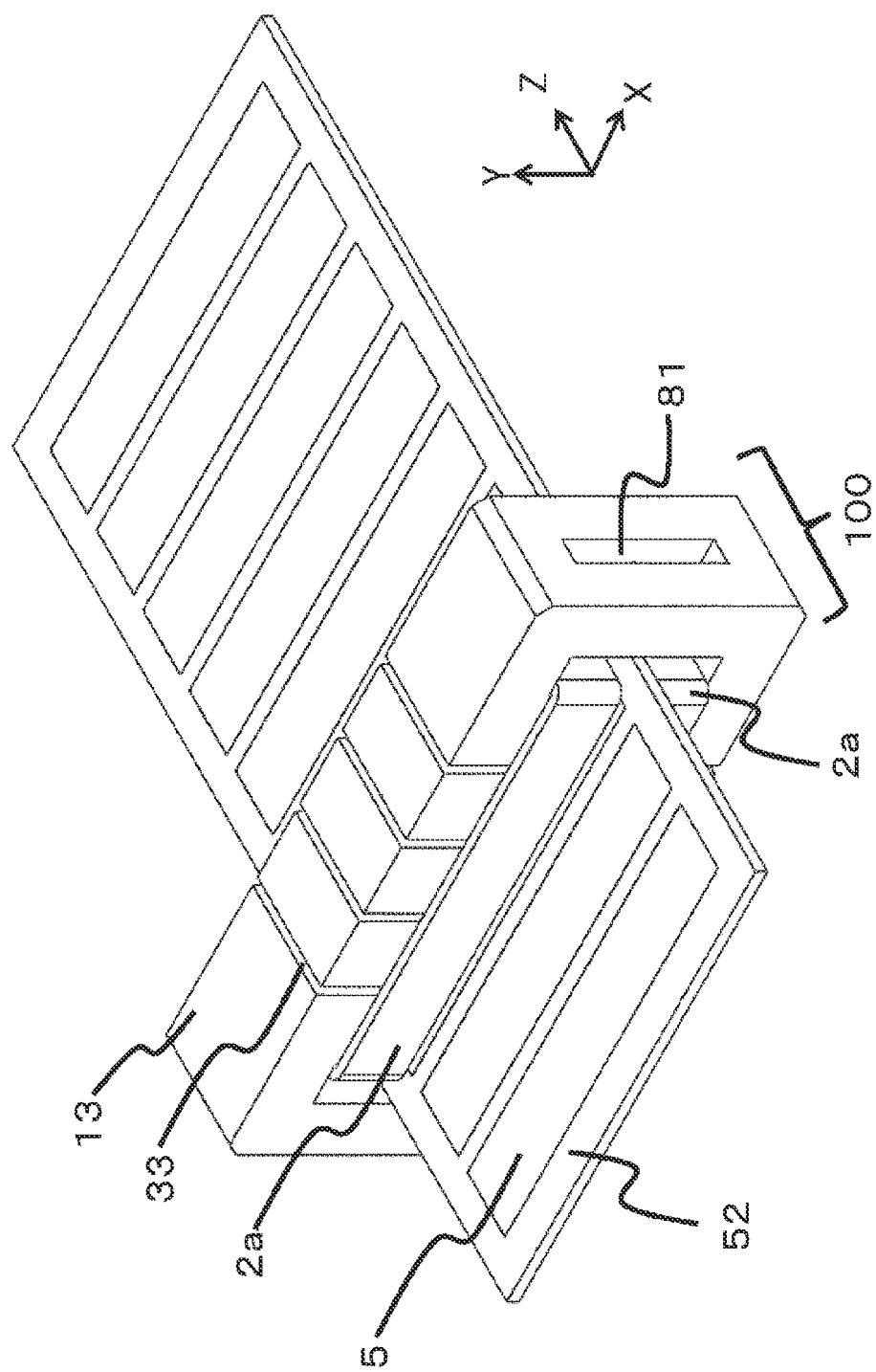
FIG. 7 is a perspective view illustrating an armature for one phase of the linear motor illustrated in FIG. 5.
Figure 8:
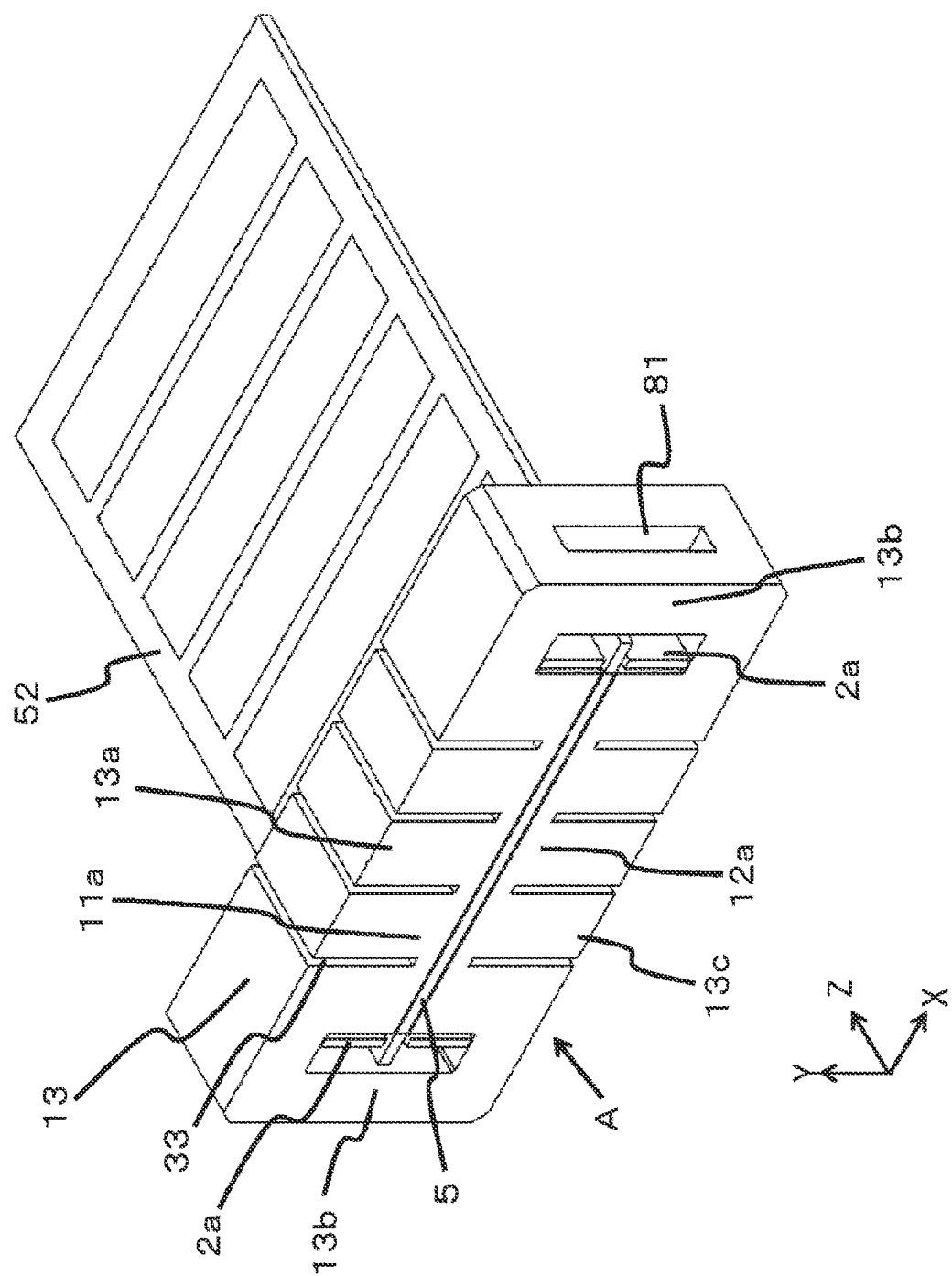
FIG. 8 is a perspective cross-sectional view on the X-Y plane of the armature for one phase illustrated in FIG. 7.
Figure 9:
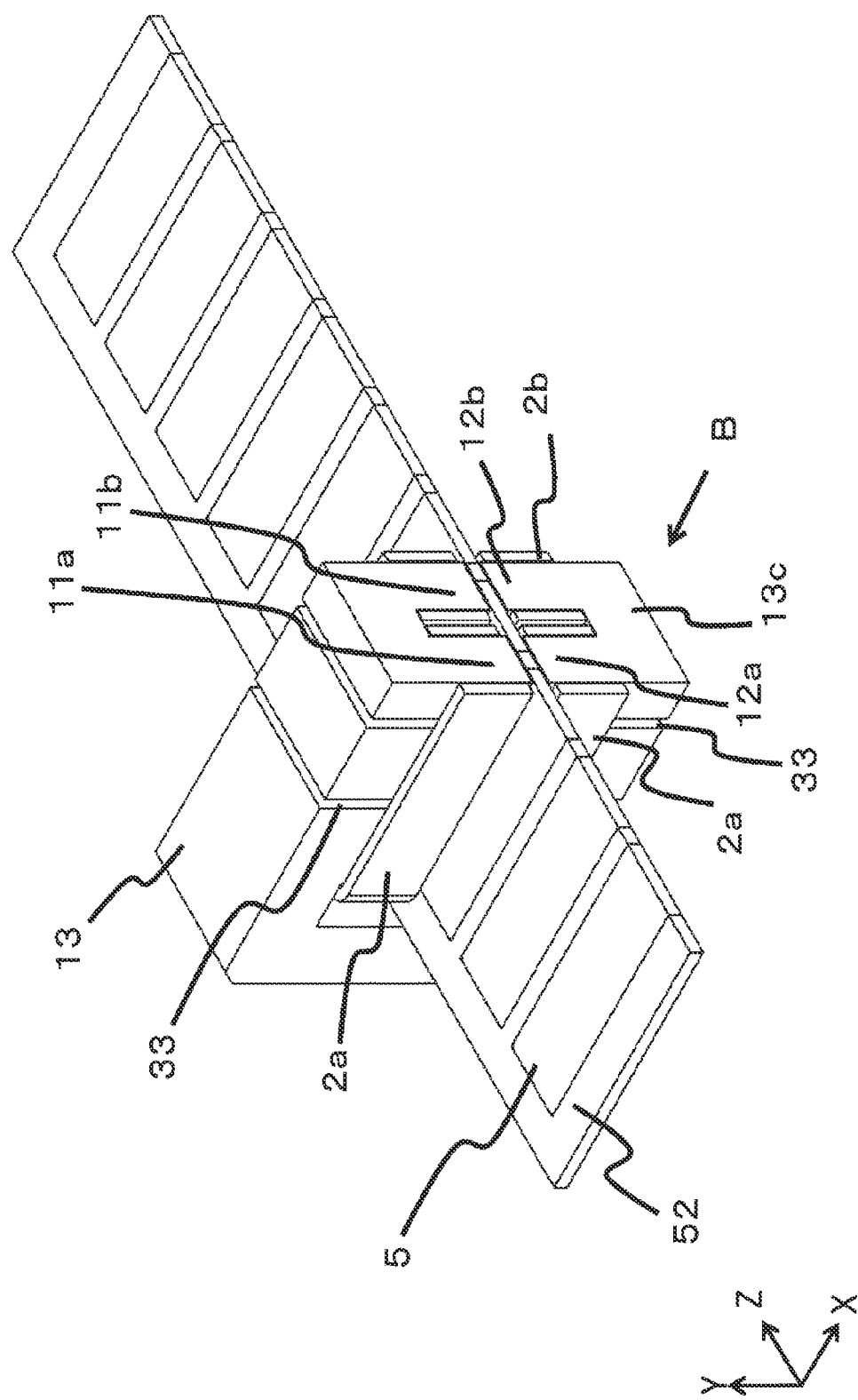
FIG. 9 is a perspective cross-sectional view on the Y-Z plan: of the armature for one phase illustrated in FIG. 7.

A flow of the magnetic fluxes will be described in detail with reference to FIGS. 5 and 6. In the embodiment, magnetic fluxes 71 and 72 generated by the first winding 2a and the second winding 2b pass through a path formed in two difference surfaces. FIG. 5 is a view indicating directions of magnetic fluxes of the linear motor according to the embodiment at a certain time. FIG. 6 is a perspective cross-sectional view on the YZ plane in FIG. 5. The magnetic flux 71 substantially passes in a surface (XY plane) orthogonal in a relative moving direction (longitudinal direction) of a stator and a moving element. The magnetic flux 72 substantially passes in a surface (YZ plane) parallel in a relative moving direction of a stator and a moving element.

Figure 10:
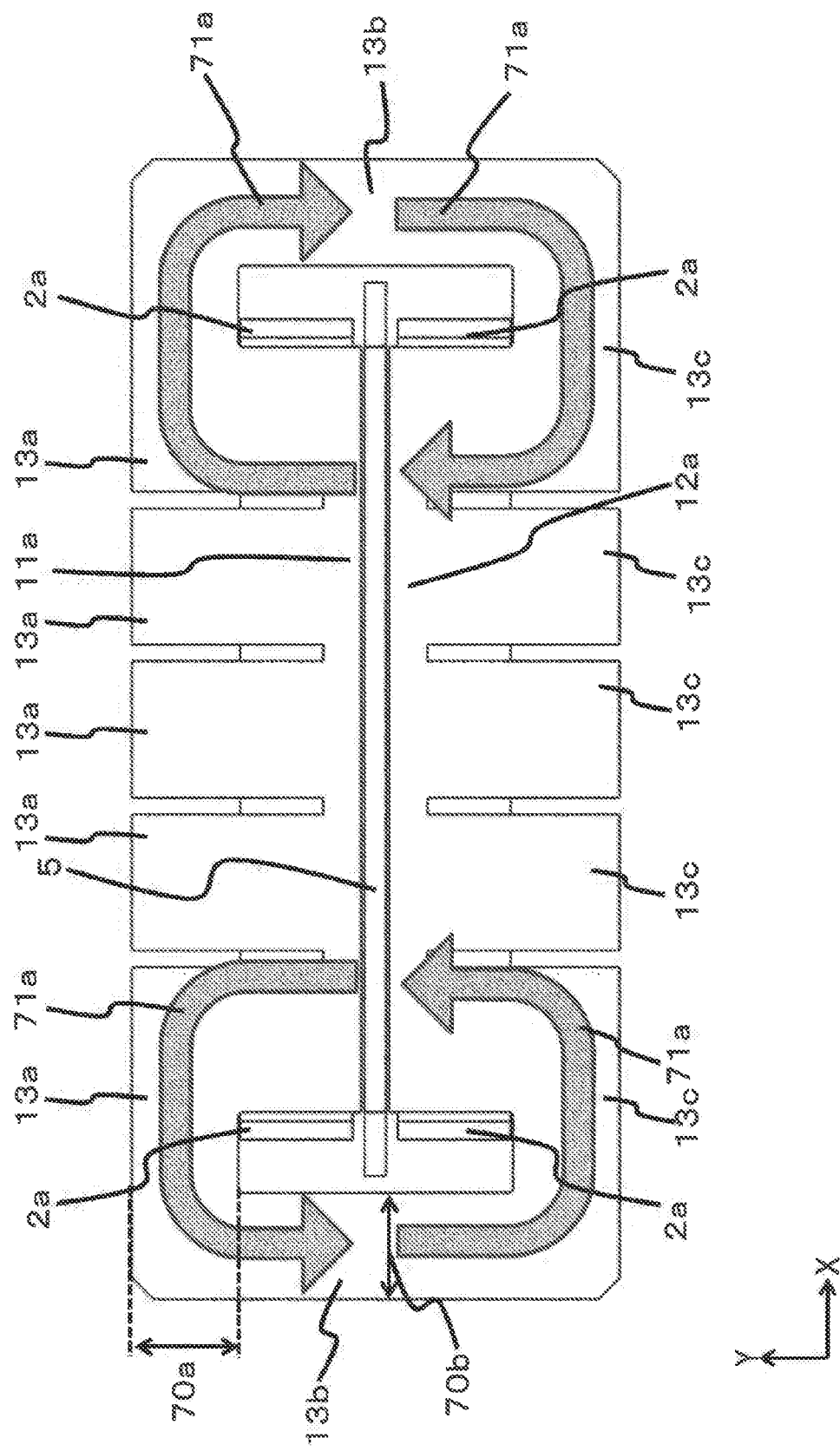
FIG. 10 is a view viewing FIG. 8 from an arrow A direction.

A detail of the above will be described below. FIG. 10 indicates an example of the magnetic flux passing in one (a first path) of the paths formed in two different surfaces. The magnetic flux 71 generated by the first winding 2a and the second winding 2b forms a path passing through once a space between the first magnetic pole tooth pair or a space between the second magnetic pole tooth pair. With reference to FIG. 10, the magnetic flux 71a generated by the first winding 2a is considered as an example of the magnetic flux 71. The magnetic flux 71a passes through the upper magnetic pole tooth 11a, the magnetic materials 13 (a magnetic material 13a on an upper side in the Y direction, a magnetic material 13b on a center side in the Y direction, and a magnetic material 13c on a lower side in the Y direction), the lower magnetic pole tooth 12a, and a space between the first magnetic pole tooth pair, and the magnetic flux 71a passes through a path (first path) for returning to the upper magnetic pole tooth 11a. Although a same path is not illustrated, the magnetic flux 71 generated by the second winding 2b forms a path passing through the second magnetic pole tooth pair. However, a direction of the path is opposite to a direction of the magnetic flux generated by the first winding 2a.

Figure 11:
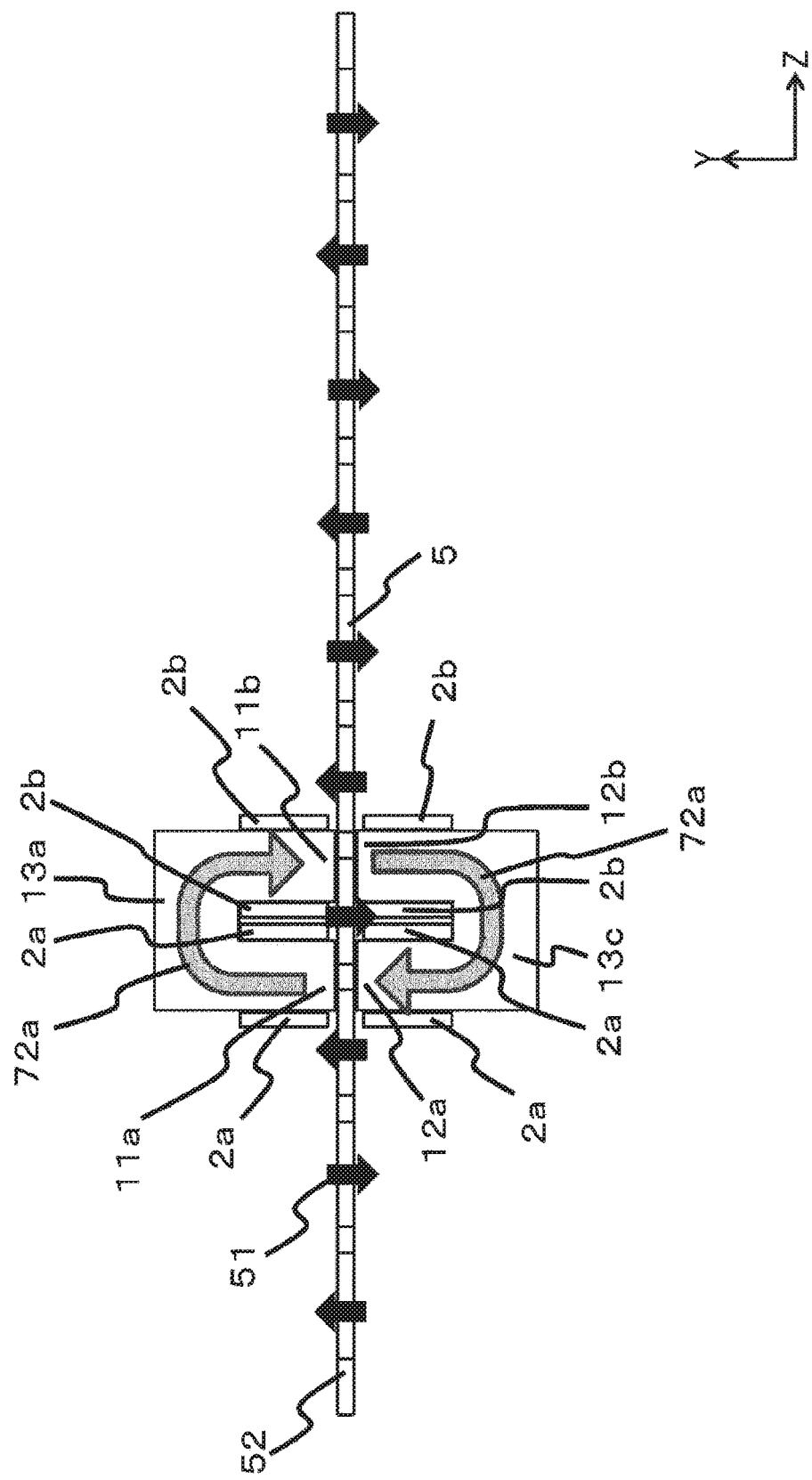
FIG. 11 is a view viewing FIG. 9 from an arrow B direction.

FIG. 11 illustrates another path (second path). A current flows in the first winding 2a and the second winding 2b in an opposite direction, and consequently a magnetic flux is generated. As a result, a path of the magnetic flux 72 is formed which passes through once each of a space between the first magnetic pole tooth pair and a space between the second magnetic pole tooth pair. The magnetic flux 72a which is an example of the magnetic flux 72 passes through the upper magnetic pole tooth 11a, the magnetic material 13a, the upper magnetic pole tooth 11b, a space between the second magnetic pole tooth pair, the lower magnetic pole tooth 12b, the magnetic material 13c, the lower magnetic pole tooth 12a, and a space between the first magnetic pole tooth pair, and the magnetic flux 72a forms a path (second path) for returning to the upper magnetic pole tooth 11a. In examples in FIGS. 10 and 11, a phase difference of currents flowing in the first winding 2a and the second winding 2b is substantially 180°, and the magnetic pole teeth 11a and 12b are an S pole, and the magnetic pole teeth 11b and 12a are an N pole.

The magnetic material 13a connects the upper magnetic pole teeth 11a and 11b of two magnetic pole tooth pairs of the armature 100. The magnetic material 13c connects the lower magnetic pole teeth 12a and 12b of two magnetic pole tooth pairs of the armature 100. Consequently, the second path is formed. Further, the magnetic material 13b connects the upper magnetic pole tooth and the lower magnetic pole tooth of each magnetic pole tooth pair by connecting the magnetic materials 13a and 13c. Consequently, the first path is formed. For description, an influence on a path of a magnetic flux by the permanent magnet 5 is not considered both in the first path and the second path.

By forming as described above, a three-dimensional path can be formed which includes two paths which are the first and second paths, and magnetic fluxes from the first winding 2a and the second winding 2b provided to magnetic pole teeth connected in a longitudinal direct on pass through the path. Consequently, a sectional area of the path of the magnetic fluxes is increased, and thrust can be efficiently generated. In addition, as illustrated in FIG. 10, magnetic path widths 70a and 70b can be reduced which are the thickness of a periphery of the armature 100 and an peripheral end of a space in which the first winding 2a and the second winding 2b are provided. Therefore, a sectional area of the linear motor illustrated in FIG. 10 can be reduced, and a small-scale and thin linear motor can be formed.

Further, in the armature 100 according to the embodiment, the winding 2 is provided to each of flat magnetic pole teeth connected by magnetic materials to form such the three-dimensional path. As a result, a magnetic flux can be efficiently used. Further, when the magnetic material is formed by using electromagnetic steel sheets, the magnetic material can be formed by steel sheets with a few shape types. Therefore, it becomes advantageous in aspects of costs and assemblability.

<Cooling Performance by Communication Hole>

In the embodiment, a communication hole 81 (refer to FIGS. 1 and 3) for communicating the first winding 2a and the second winding 2b provided to the magnetic pole teeth 11 and 12 with an outer side of the armature 100 (magnetic material 13) is formed on a side surface of the armature 100 (surface parallel to a longitudinal direction). Preferably, the communication hole 81 is formed between two magnetic pole tooth pairs of the armature 100 in a side view. Cooling air can be supplied to the first winding 2a and the second winding 2b via the communication hole 81, and therefore cooling performance can be improved. In addition, wire drawability of the first winding 2a and the second winding 2b can be improved by using the communication hole 81. Regardless of whether the communication hole 81 is provided, a magnetic flux flows in accordance with a magnetic potential, and therefore motor driving according to the embodiment can be realized.

In addition, an armature of each phase is independent in the linear motor according to the embodiment, and unbalance is not caused in the three-phase armature. Therefore, reduction in a thrust ripple and low detent can be realized. According to the embodiment, an apparatus can be downsized, and also a magnetic flux can be effectively shared between adjacent magnetic poles.

<Electric Resistance Unit>

A linear motor according to the embodiment includes an electric resistance unit along a longitudinal direction in the magnetic material 13 as illustrated in such as FIG. 1. In the embodiment, a slit 33 is provided to form an air space. The electric resistance unit can be realized by a contact resistance generated at a contact portion of same types or different types of materials provided to the magnetic material 13. For example, the electric resistance unit is formed by surface-contacting a plurality of materials of the magnetic material. Further, a material having a larger electric resistance than the magnetic material 13 is not necessarily used. For example, even if a material having a smaller electric resistance than the magnetic material 13 is used, in consideration of such as a contact resistance, a portion is at least formed in which an electric resistance is entirely increased in a longitudinal direction of the armature 100.

Figure 12:
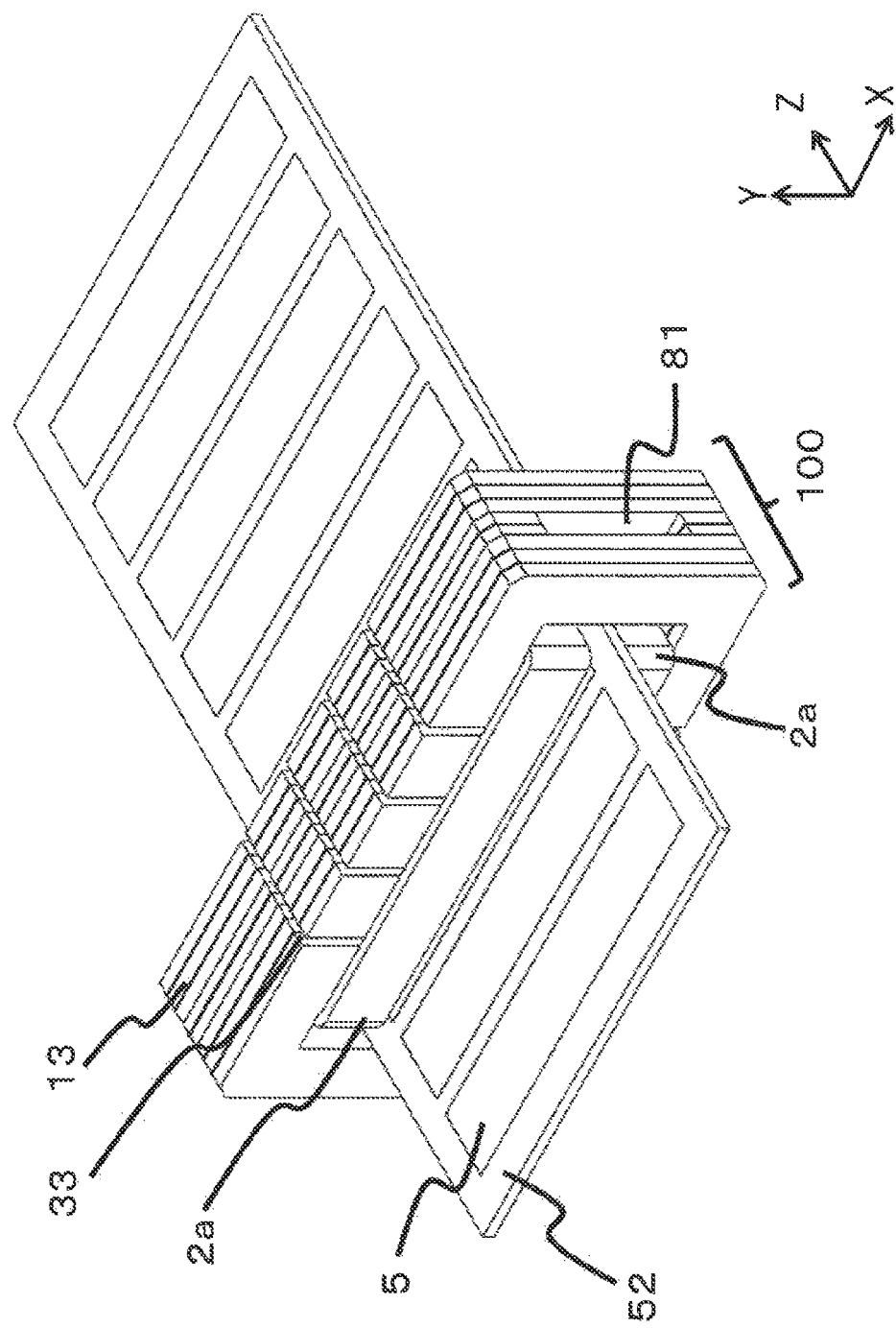
FIG. 12 is a perspective view of a linear motor and illustrates a configuration example of a magnetic path of an armature.

In the embodiment, by providing a slit 33 along a moving direction (longitudinal direction) of a moving element as an electric resistance unit, especially, an eddy current path generated by a magnetic flux flowing in the second path can be cut or extended. Further, by changing a width or an interval of the slit, an amount of the magnetic flux 71a illustrated in FIG. 10 and an amount of the magnetic flux 72b illustrated in FIG. 11 can be changed. Furthermore, a surface area of the armature 100 can be increased by the slit 33, and therefore cooling performance can be improved. Since the cooling performance is improved, a large current can flow in a winding, and the apparatus can be further downsized. In addition, as illustrated in FIG. 12, the magnetic materials 13 can be laminated in the Z direction. As a result, a contact surface of the magnetic material 13 can be generated along a lateral direction, and therefore an eddy current caused by a magnetic flux flowing in the first path by a contact resistance can be reduced.

Figure 13:
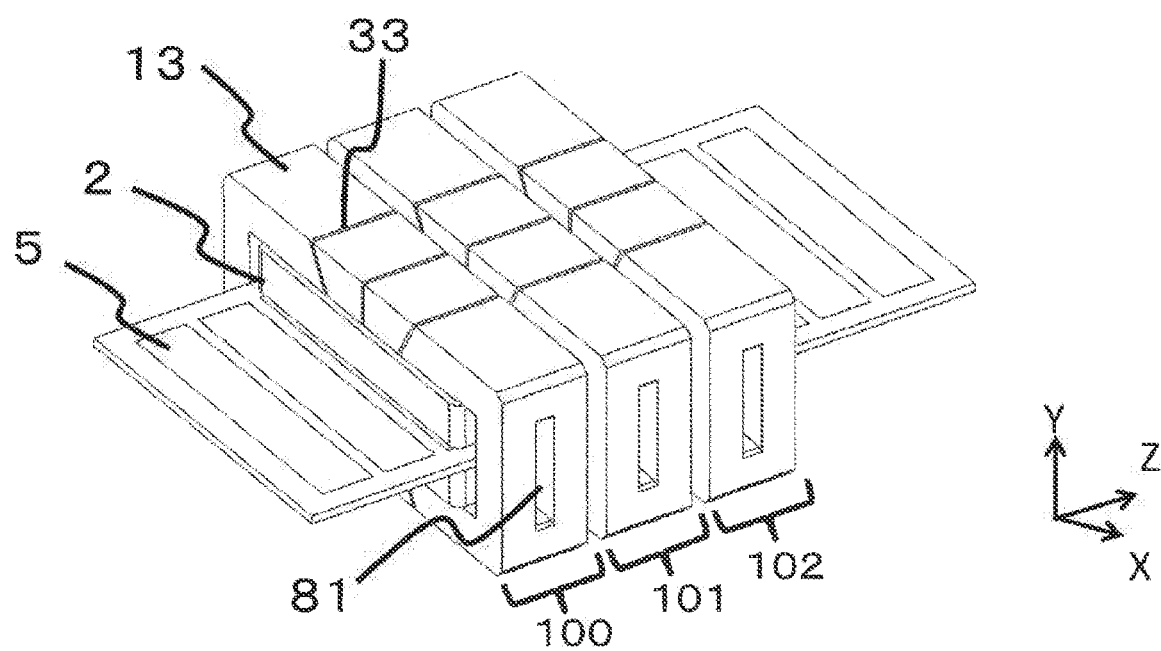
FIG. 13 is a view illustrating a slit according to a linear motor in a second embodiment.

FIG. 13 is a view indicating an example in which an electric resistance unit such as the slit 33 is provided in a radial shape extending toward a periphery of an armature. A magnetic flux flowing to magnetic pole teeth in the first path or a magnetic flux flowing out from the magnetic pole teeth move while orbiting radially. When an electric resistance unit is provided in parallel with the YZ plane, a magnetic flux needs to avoid the electric resistance unit. As a result, a magnetic path is extended, and a loss is increased. In the embodiment, a part of or all of the slit 33 is provided along the Z direction and in non-parallel with the YZ plane, and consequently, the magnetic path length is shortened.

Second Embodiment

<Cooling Pipe>

Figure 14:
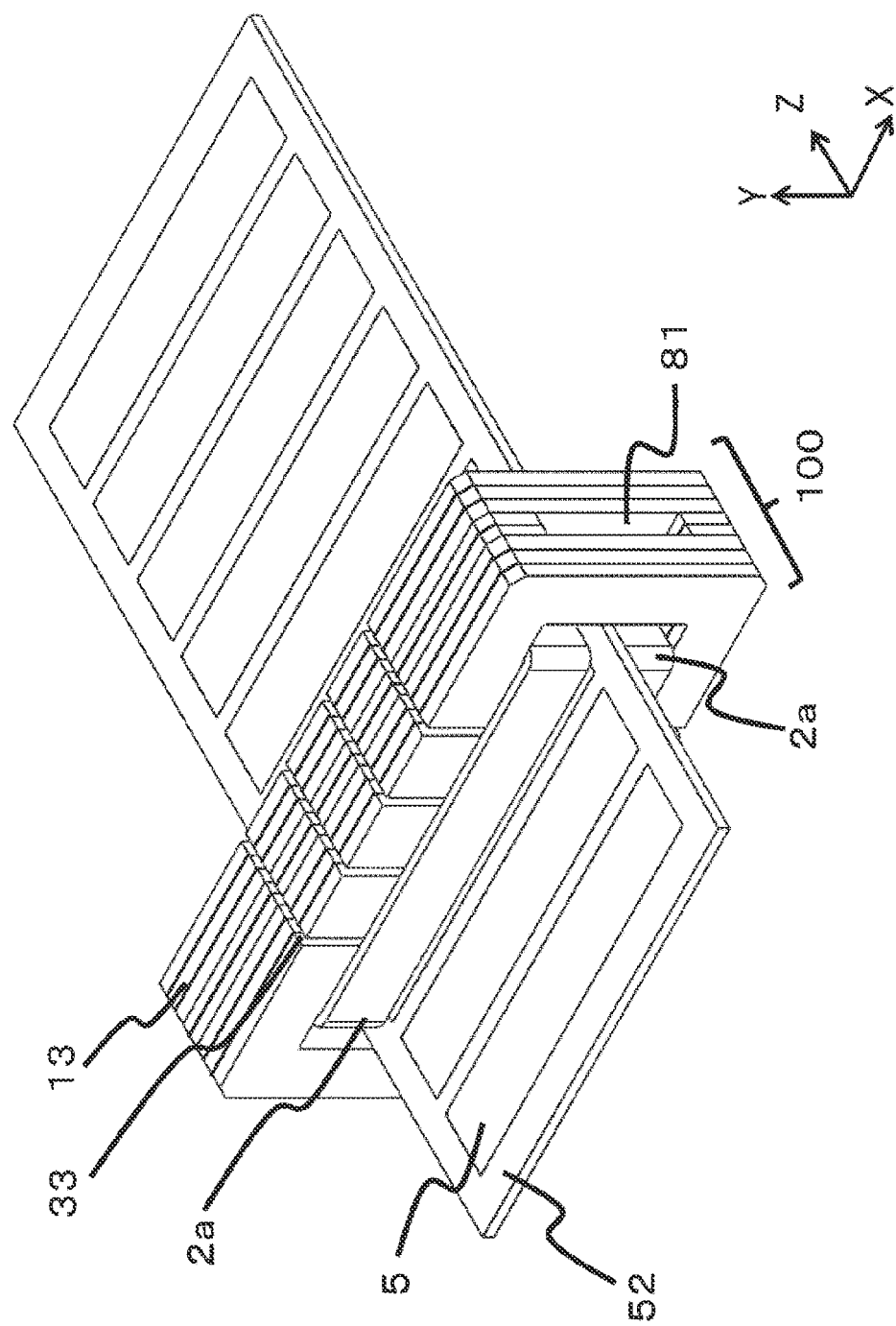
FIG. 14 is a perspective view of a linear motor according to the linear motor in the second embodiment.

FIGS. 14 to 18 indicate a second embodiment of the linear motor according to the present invention. The linear motor according to the embodiment has a same configuration as in the first embodiment other than the following points. FIG. 14 is a perspective view of the linear motor according to the second embodiment. A magnetic material 13 includes a slit 33 as an electric resistance unit. The slit 33 includes a cooling pipe 20. Such as cooling water can flow on an inner side of the cooling pipe 20. By disposing the cooling pipe 20 by inserting into the slit 33, cooling performance can be improved without increasing a dimension in an XY plane.

Figure 15:
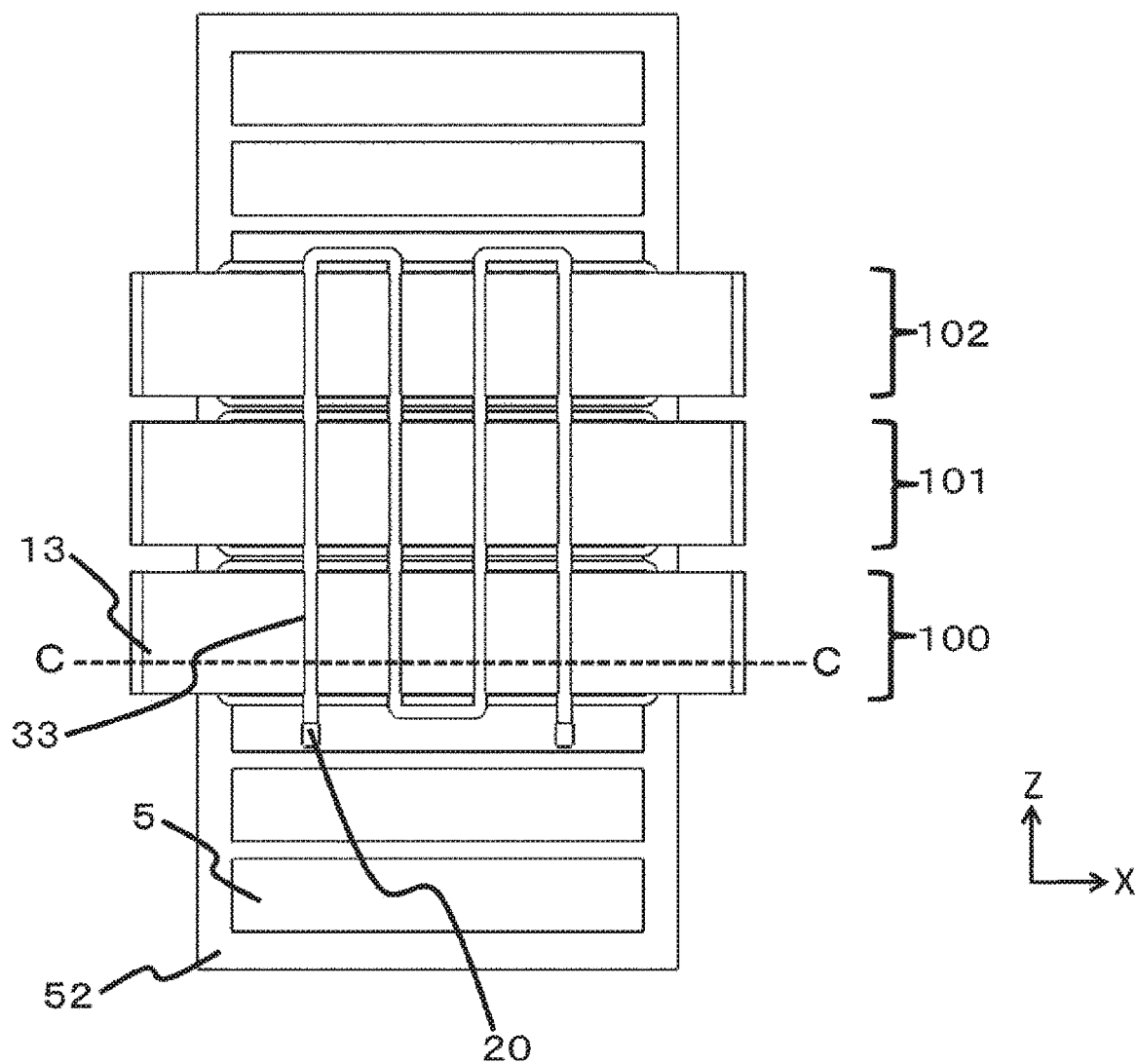
FIG. 15 is a top view describing an arrangement example of a cooling pipe of a linear motor according to the linear motor in the second embodiment.

FIG. 15 is a top view of the linear motor according to the embodiment. The cooling pipe 20 is disposed so as to penetrate a plurality of armatures 100, 101, and 102. In the embodiment, one cooling pipe 20 is disposed to a plurality (four) of slits 33 of each armature. However, the configuration is not limited even if the same effect can be obtained. For example, a plurality of the cooling pipes 20 may be provided. In this case, occurrence of a temperature difference between an upstream, side and a downstream, side of the cooling pipe 20 can be suppressed, and each armature can be equally cooled.

<Fixing Hole>

Figure 16:
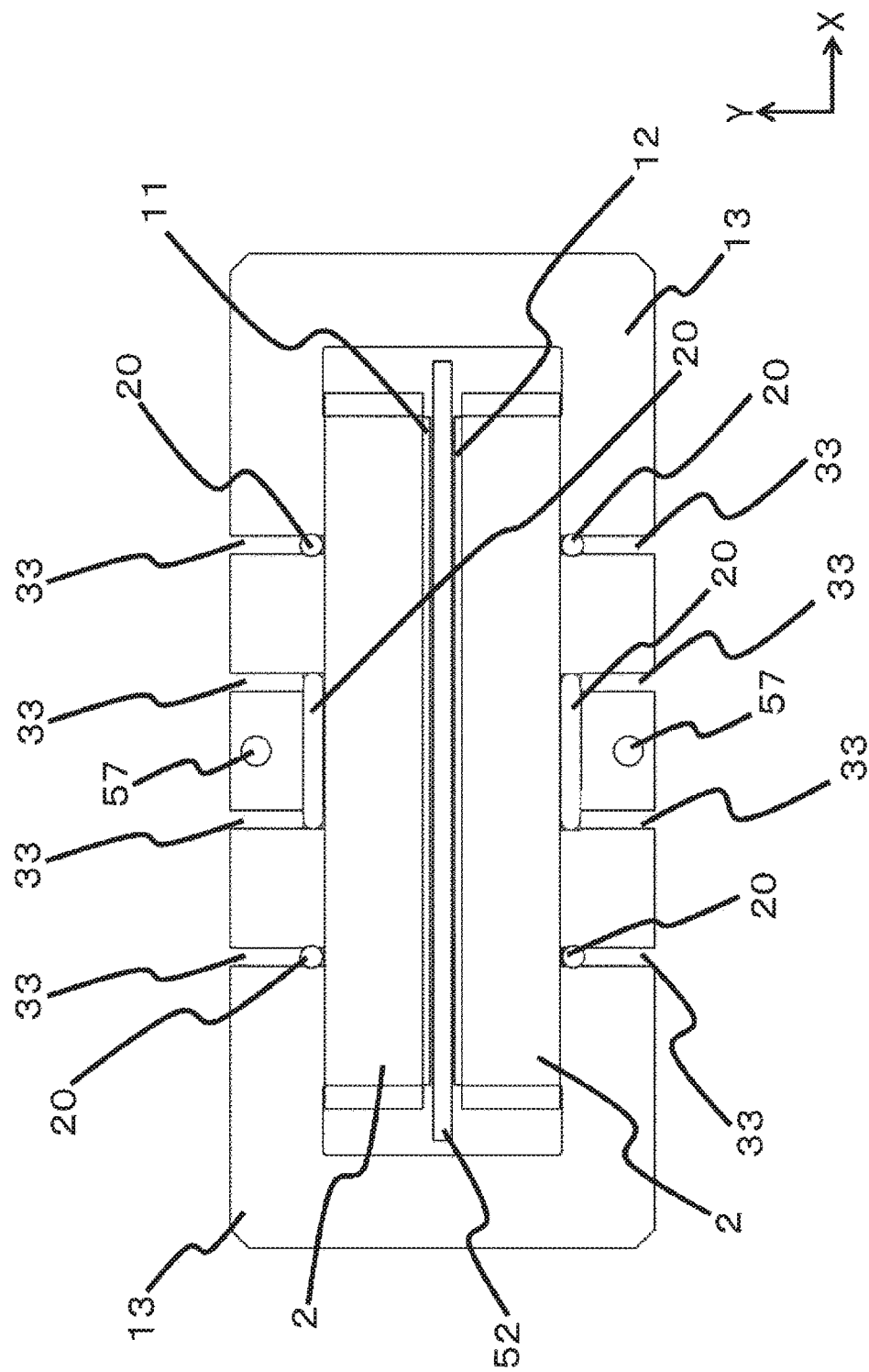
FIG. 16 is an elevation view of a linear motor according to the linear motor in the second embodiment.

FIG. 16 is an elevation view of the linear motor in the embodiment. The magnetic material 13 includes a fixing hole 57 penetrating in a longitudinal direction. Each armature can be fixed by penetrating such as a shaft into the fixing hole 57, and intervals between armatures can be adjusted by inserting such as a color and a spacer. In the case where the magnetic material 13 is formed by laminating such as electromagnetic steel sheets in a longitudinal direction, the magnetic material 13 needs to be fixed to avoid decomposition. By inserting such as a bolt in the fixing hole 57, the magnetic material 13 can be fixed while inhibiting an increase in size of the armature. Since magnetic pole teeth 11 and 12 according to the embodiment have a flat shape, shape types of the electromagnetic steel sheets to be laminated can be reduced.

Further, the fixing hole 57 is preferably provided near a center in a lateral direction of the magnetic material 13. A magnetic flux flowed in and out from the magnetic pole teeth 11 and 12 radially move. Therefore, an amount of the magnetic flux passing through near a center of the magnetic material 13 is reduced. Therefore, electromagnetic steel sheets can be fixed while preventing interference of flow of the magnetic flux.

<Slit Depth>

Figure 17:
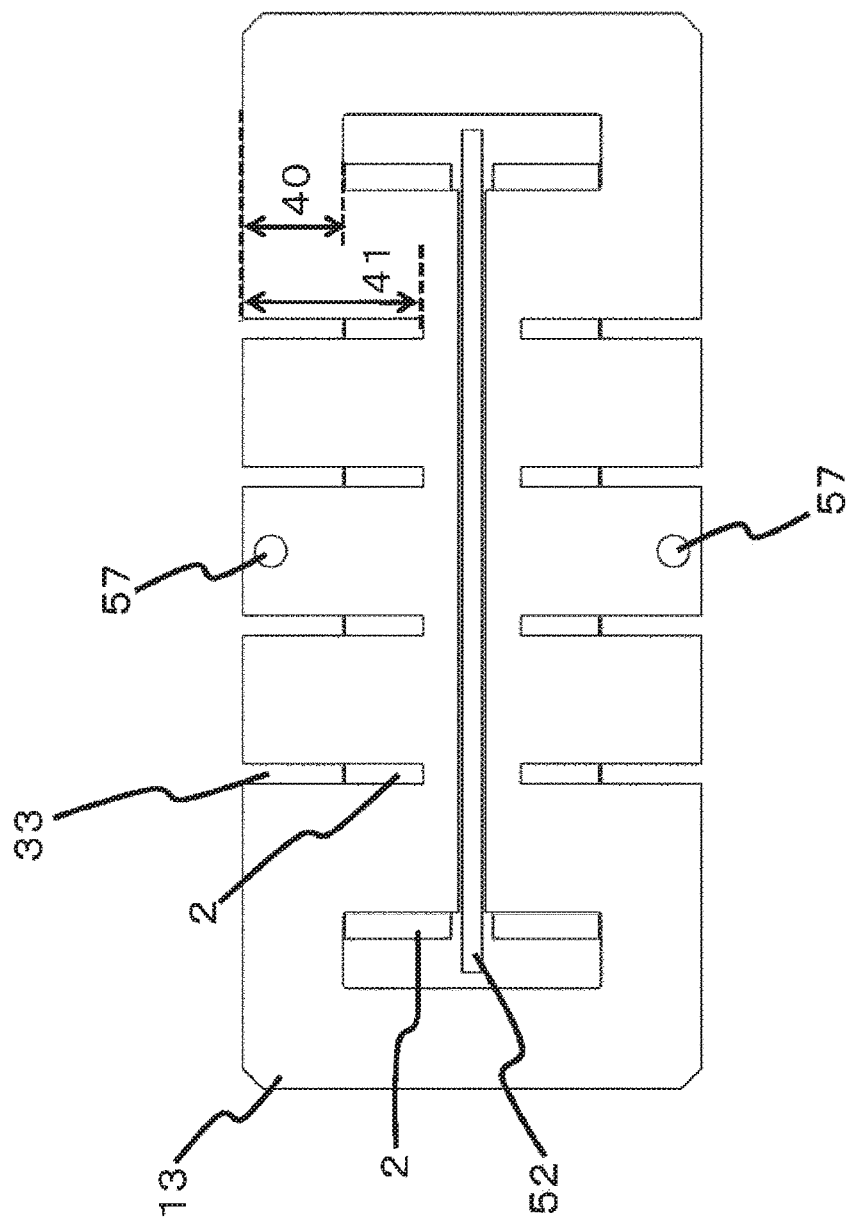
FIG. 17 is a sectional view cut on a C-C cross-section in FIG. 15.

FIG. 17 is a view cut on a C-C cross-section in FIG. 15. However, the cooling pipe 20 is not illustrated in FIG. 17. A distance from a surface of the armature 100 (for example, a surface on an upper direction side) to an end on a surface side of the winding 2 provided on the surface side (for example, an upper side surface of the winding 2) is a winding depth 10. Further, a depth of the slit 33 (a distance from one end to another end of the slit 33) provided on a surface of the armature 100 (for example, a surface on an upper direction side) is a slit depth 41. In the case where the slit depth 41 is set so as to satisfy an inequality, (the slit depth 41)>(the winding depth 40), with respect to the winding depth 40, the slit 33 reaches an inner side of a volume surrounded by the winding 2.

Therefore, the winding 2 can be cooled from the inner side by blowing cooling air from the outside. As a result, a limitation of a current value which can be flowed in the winding 2 is increased, and a linear motor with large thrust can be realized. Further, even if thrust is the same, downsizing can be realized. Furthermore, in the case where the inequality, (the slit depth 41)>(the winding depth 40), is satisfied, and the cooling pipe 20 is disposed to the slit 33, the cooling pipe 20 can be made to contact with the winding 2. In the case where the cooling pipe 20 is provided so as to come into contact with the winding 2, cooling performance can be further improved.

The fixing hole 57 is provided within a range from a surface of the magnetic material 13 to the winding depth 40. As a result, the fixing hole 57 is not overlapped with the winding.

Figure 18:
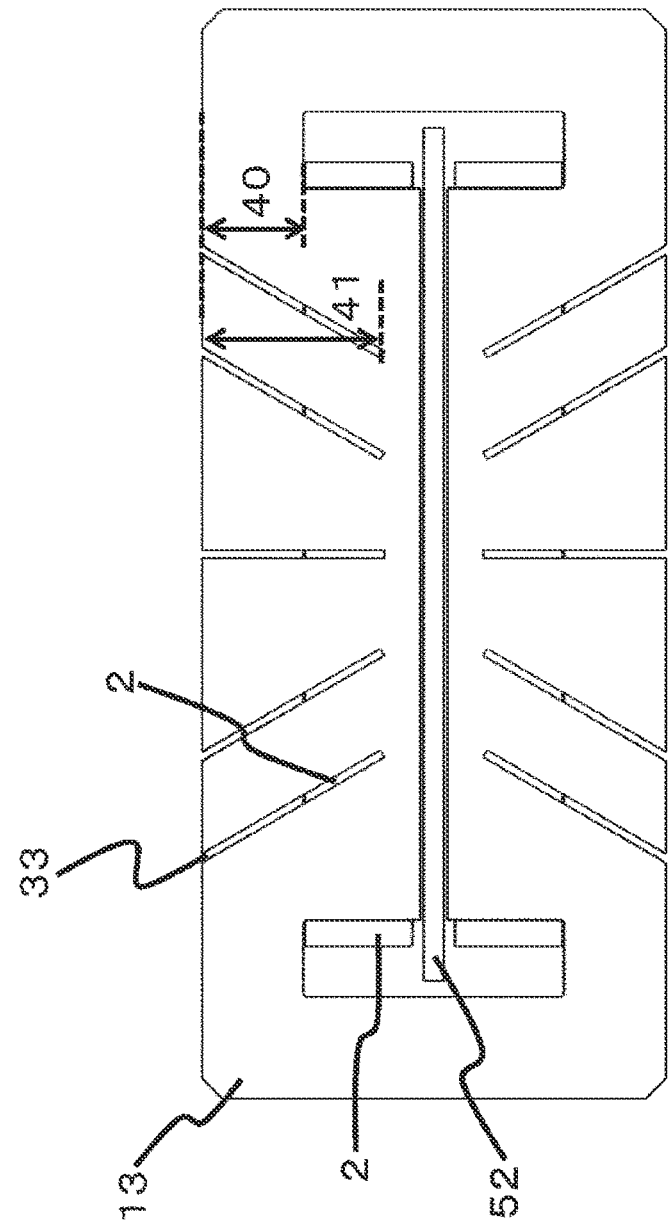
FIG. 18 is a view illustrating an example of an positional relation of a radial slit.

Further, as illustrated in FIG. 18, a part of or all of the slit 33 can be inclined so as to be non-parallel with the YZ plane. As in this case, in the case where the inequality, (the slit depth 41)>(the winding depth 40), is satisfied, and the cooling pipe 20 is disposed to the slit 33, the cooling pipe 20 can be made to contact with the winding 2.

Third Embodiment

<Three-Phase Driving by One Armature>

Figure 19:
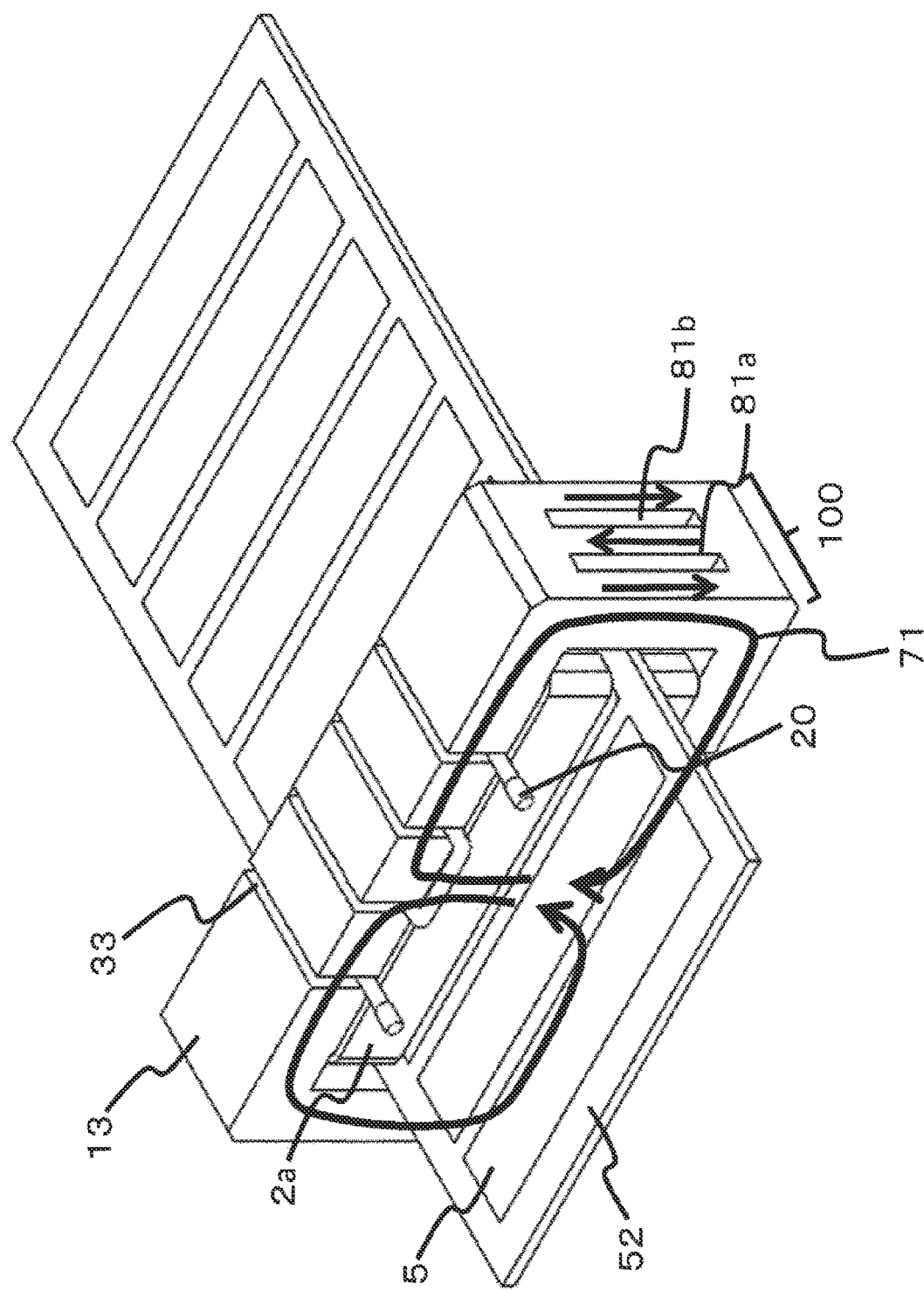
FIG. 19 is a side view of an example of a linear motor according to a third embodiment, in which one armature forms U, V, and W phases.

FIGS. 19 to 22 indicate a third embodiment of the linear motor in the present invention. The linear motor according to the embodiment is related to three-phase driving, and a configuration thereof is similar to the configurations in the first and second embodiments other than the following points. An armature 100 according to the embodiment includes a third magnetic pole tooth pair including magnetic pole teeth 11a3 and 12a3 in addition to the first magnetic pole tooth pair including magnetic pole teeth 11a1 and 12a1 and the second magnetic pole tooth pair including magnetic pole teeth 11a2 and 12a2, which are disposed opposite to each other in a vertical direction. The magnetic pole teeth of either or both of each magnetic pole tooth pair include a first winding 2a, a second winding 2b, and a third winding 2c. A phase difference of current flowing in adjacent windings, in other words, the first winding 2a and the second winding 2b and the second winding 2b and the third winding 2c is substantially 120°. As a result, U, V, and W phases can be formed by one armature 100. In this case, at least one of the first winding 2a, the second winding 2b, and the third winding 2c supplies a magnetic flux in an opposite direction with the other two windings 2. The armature 100 includes two communication holes 81a and 81b as a communication hole 81. From a viewpoint of cooling performance, it is preferable that the communication holes 81a and 81b are respectively provided between the first magnetic pole tooth pair and the second magnetic pole tooth pair and between the second magnetic pole tooth pair and the third magnetic pole tooth pair in a side view. Regardless of whether the communication hole 81 is provided, a magnetic flux flows in accordance with a magnetic potential, and therefore the three-phase driving according to the embodiment can be realized. As configured in this manner, the three-phase driving can be realized by one armature 100. As illustrated in FIG. 19, a first path which is a path of a magnetic flux 71 passing through any of the magnetic pole tooth pairs is formed. Further, as illustrated in FIG. 20(a), as a second path, two paths passing through two magnetic pole tooth pairs is formed at each time. Therefore, the same effects as in the first embodiment can be obtained. In the embodiment, two permanent magnets 5 are adjacently arranged to moving elements with respect to three magnetic pole tooth pairs of the armature 100. In this manner, as illustrated in FIG. 20(b), a linear motor is driven when a U-phase current flows in the first winding 2a, a V-phase current flows in the second winding 2b, and a W-phase current flows in the third winding 2c.

<Three-Phase Driving by Multiple Armatures>

Figure 21:
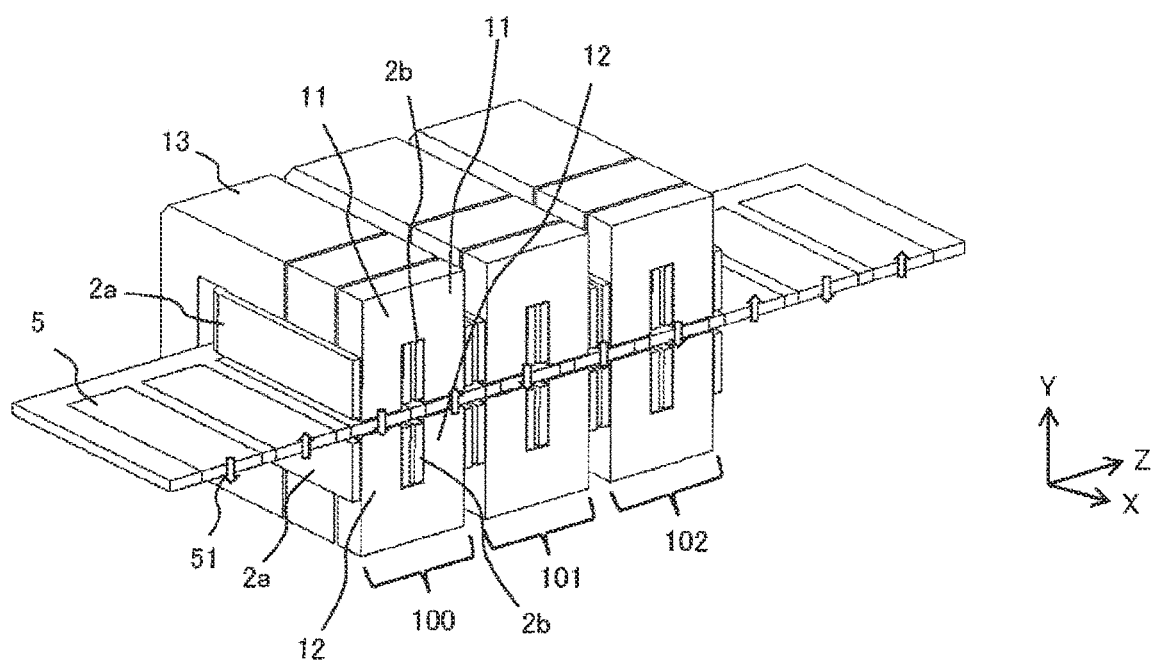
FIG. 21 is a perspective cross-sectional view describing an example of a linear motor forming each of U, V, and W phases by one armature.
Figure 22:
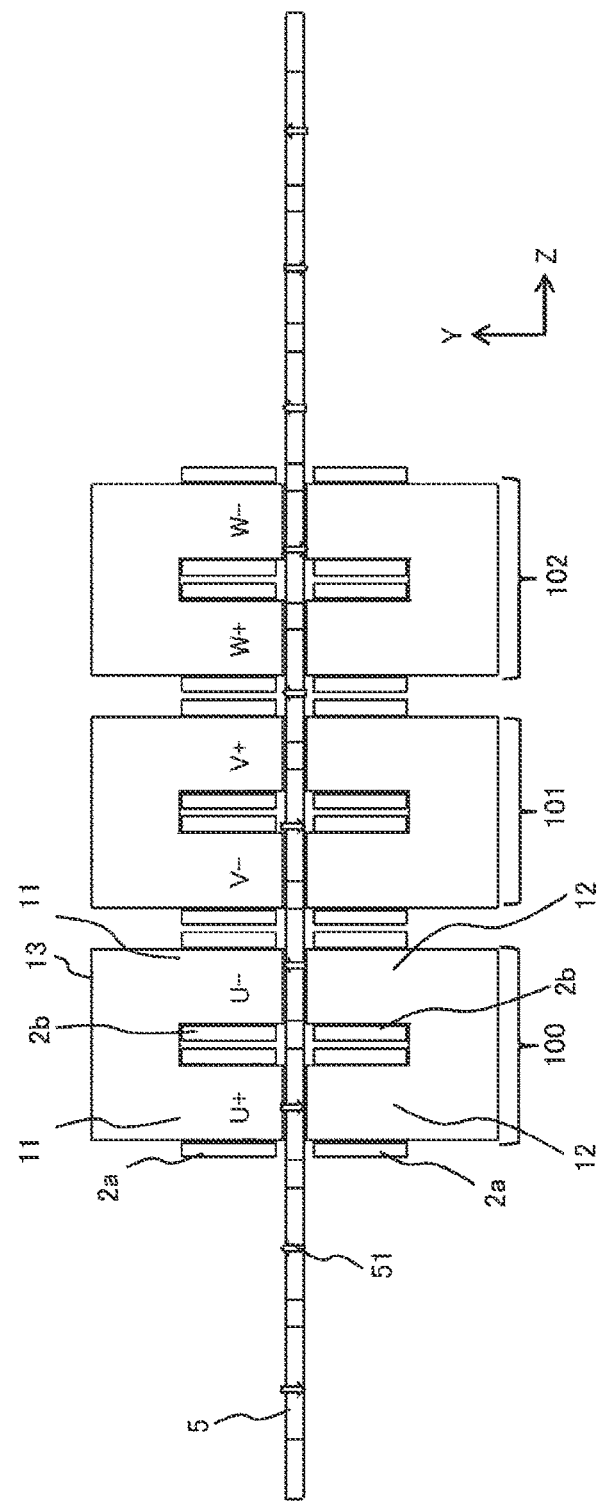
FIG. 22 illustrates an example of a winding phase of the linear motor illustrated in FIG. 21.

As described in such as the first embodiment, the U, V, and W phases can be realized by separate armatures 100, 101, and 102 respectively (refer to FIGS. 21 and 22). In each winding 2 of the armatures of the U, V, and W phases, an electrical phase difference between the U phase and the V phase is approximately 120°, and an electrical phase difference between the V phase and the W phase is approximately 120°. The armatures 100, 101, and 102 each forming the second path includes two magnetic pole tooth pairs in a longitudinal direction. Each phase difference of two magnetic pole tooth pairs of each phase is approximately 180°. Specifically, the winding 2 provided to each of two magnetic pole tooth pairs included in each armature supply magnetic fluxes in an opposite direction.

FIG. 22 indicates an arrangement of each phase. In the embodiment, the windings 2 are arranged in the order of U+, U−, V−, V+, W+, and W− phases. Each of phase differences of the U+, V+, and W+ phases are substantially 120°, and each of phase differences between the U+ and U− phases, the V+ and V− phases, and the W+ and W− phases is approximately 180°. As illustrated in FIG. 22, the + side and the − side of each phase are adjacent. In the case of forming three-phase driving in this manner, for example, five or seven permanent magnets can be arranged to a moving element with respect to six magnetic pole tooth pairs arranged in a longitudinal direction. The first winding 2a and the second winding 2b are set such that an electrical phase difference shifts at substantially 180°, and directions of magnetic fluxes formed by the first winding 2a and the second winding 2b are opposite each other in a vertical direction. Consequently, a second path is formed.

In the case where separate armatures form three phases as described above, magnetic interference among the phases can be suppressed. Therefore, end effects caused by an end armature of a linear motor and an armature disposed so as to be sandwiched by armatures can be reduced, and a thrust ripple can be reduced.

Fourth Embodiment

<Stator Relatively Moving with Multiple Moving Elements>

Figure 23:
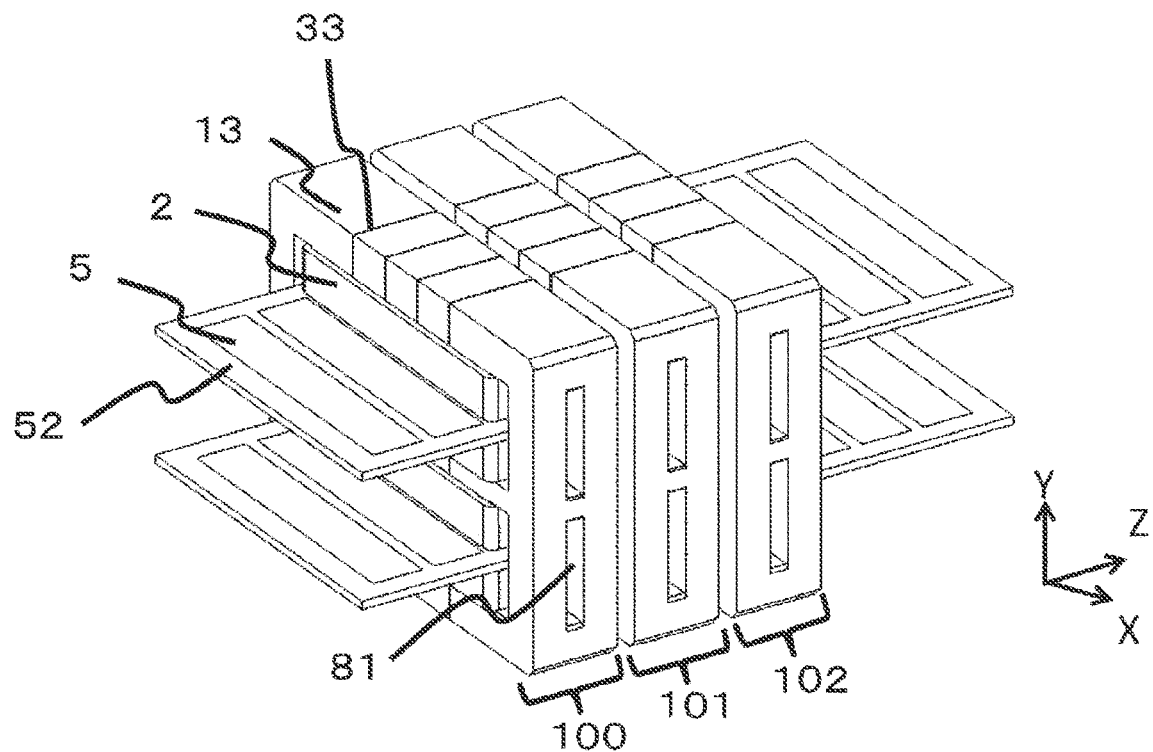
FIG. 23 illustrates a configuration example of a linear motor according to a fourth embodiment in which moving elements are formed in two stages.
Figure 24:
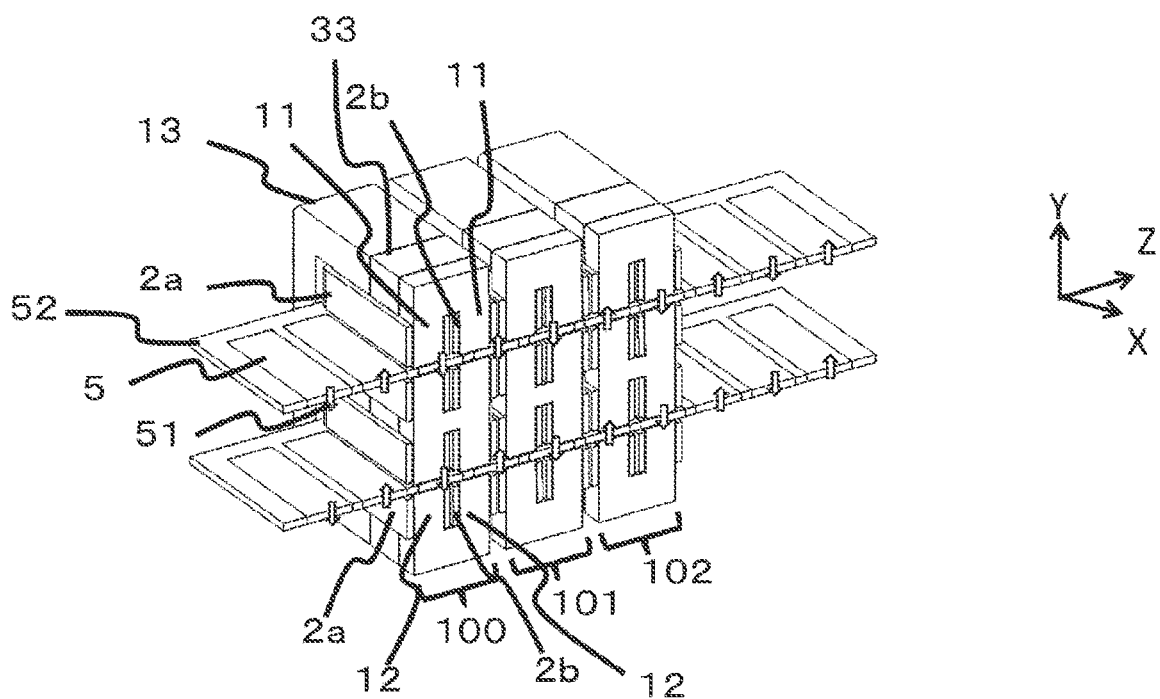
FIG. 24 is a cross-sectional schematic view on a YZ plane of the linear motor illustrated in FIG. 23.
Figure 25:
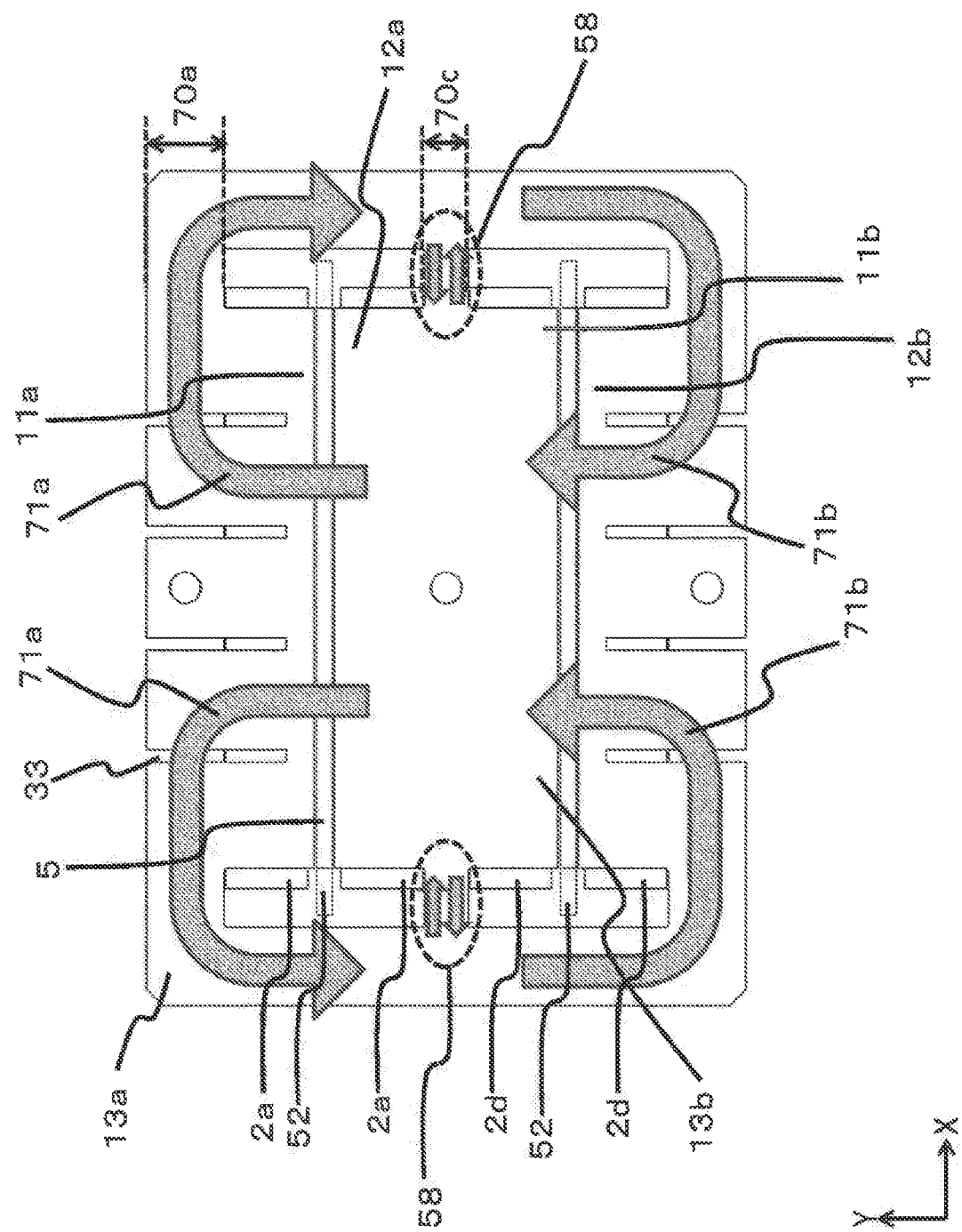
FIG. 25 is an elevational sectional view describing a first path of a magnetic flux of the linear motor in which moving elements are formed in two stages.

FIGS. 23 to 25 indicate a fourth embodiment of the linear motor according to the present invention. FIG. 23 is a perspective view of the linear motor according to the fourth embodiment, and FIG. 24 is a side sectional view of the linear motor according to the embodiment. The linear motor according to the embodiment has a same configuration as in the first to third embodiments other than the following points. The linear motor according to the embodiment includes multiple moving elements in a vertical direction orthogonal to a longitudinal direction which is a moving direction of the moving elements. As a result, the linear motor can be downsized. As illustrated in FIGS. 23 and 24, the linear motor according to the embodiment includes two moving elements arranged in the Y direction. For description, a moving element on an upper side of the Y direction is called "an upper moving element", and a moving element on a lower side is called "a lower moving element".

At least one or more armatures are disposed in the longitudinal direction, and also two or more moving elements are arranged in the vertical direction.

FIG. 25 is an elevational sectional view of the linear motor according to the embodiment illustrated in FIGS. 23 and 24 and indicates a path of a magnetic flux by arrows.

An armature 100 according to the fourth embodiment includes, as illustrated in FIG. 25, an upper first magnetic pole tooth pair and a lower first magnetic pole tooth pair. The upper first magnetic pole tooth pair includes magnetic pole teeth 11a and 12a disposed opposite to each other via a space in which the upper moving element relatively moves. The lower first magnetic pole tooth pair includes a magnetic pole teeth 11b and 12b disposed opposite to each other via a space into which the lower moving element moves. In addition, the armatures 100 according to the embodiment includes an upper second magnetic pole tooth pair and a lower second magnetic pole tooth pair so as to be disposed in a longitudinal direction of the upper first magnetic pole tooth pair and the lower first magnetic pole tooth pair, respectively. The four magnetic pole tooth pairs are connected by a magnetic material 13 and form a magnetic circuit. In magnetic circuits of the upper first magnetic pole tooth pair and the lower first magnetic pole tooth pair and magnetic circuits of the upper second magnetic pole tooth pair and the lower second magnetic pole tooth pair, a first path is formed by the same configuration. Therefore, the upper first magnetic pole tooth pair and the lower first magnetic pole tooth pair illustrated in FIG. 25 are representatively described. Magnetic pole teeth have a substantially same shape, and also an upper third magnetic pole tooth pair and a lower third magnetic pole tooth pair may be included.

Further, for description, the magnetic pole teeth 11a and 12b disposed outermost in a vertical direction of the armature 100 is denoted as outside magnetic pole teeth 11a and 12b. Further, the magnetic pole teeth 12a and 11b which are not disposed outermost in the vertical direction of the armature 100 is denoted as inside magnetic pole teeth 12a and 11b.

The outside magnetic pole teeth 11a and 12b are connected by an outside magnetic material 13a. The inside magnetic pole teeth 12a and 11b are connected by an inside magnetic material 13b. Further, the outside magnetic material 13a and the inside magnetic material 13b are connected by an iron core connecting portion 58. The iron core connecting portion 58 is a magnetic material of a magnetic path width 70c supporting the inside magnetic material 13b.

A first winding 2a and a second winding 2d of the armature 100 are arranged in a vertical direction, and magnetic fluxes supplied by the windings face in the same direction. In this manner, both of the magnetic fluxes supplied by the first winding 2a and the second winding 2d pass through the outside magnetic material 13a, the outside magnetic pole tooth 12b, the inside magnetic pole tooth 11b, the inside magnetic material 13b, the inside magnetic pole tooth 12a, and the outside magnetic pole tooth 11a. Specifically, magnetic flux by each winding passes through both of the upper and lower magnetic pole tooth pairs, and therefore a thrust efficiency with respect to moving elements is improved. Further, a part of the magnetic flux flows in the iron core connecting portion 58. However, this magnetic flux is cancelled. Therefore, the magnetic path width 70c which is a width in a vertical direction of the iron core connecting portion 58 can be narrowed in comparison with the magnetic path width 70a which is a length from a surface of the outside magnetic material 13a to a surface side of the winding 2.

For comparison, the case where the armatures 100 according to the first embodiment are vertically laminated (the case where vertical magnetic circuits are independently arranged) is considered. In this case, the sum of the height of a magnetic material disposed lower than a moving element in an armature on an upper stage and the height of a magnetic material disposed higher than a moving element in an armature on a lower stage is needed to be the height corresponding to twice of the magnetic path width 70a. On the other hand, as in the embodiment, in the case where the armature 100 moves relatively with a plurality of moving elements 6, a magnetic flux flowing in the iron core connecting portion 58 is cancelled. Therefore, the magnetic path width 70c can be narrowed in comparison with the magnetic path width 70a. Specifically, (the magnetic path width 70a)>(the magnetic path width 70c) is established.

As a result, a height in the Y direction of a linear motor can be reduced, and a small scale linear motor can be provided. The magnetic path width 70a and the magnetic path width 70c are equal to or larger than the length in a vertical direction of a fixing hole 57. By forming in this manner, preferably, the magnetic material 13 can be formed by laminating electromagnetic steel sheets in a longitudinal direction, and a bolt can be inserted into the fixing hole 57.

Although an example of two moving elements has been described in the fourth embodiment, similar effects may be obtained by three or more moving elements. Further, downsizing the linear motor according to the embodiment can be realized by the magnetic path width 70c which can be formed by including two or more magnetic pole tooth pairs in a vertical direction. Therefore, two or more magnetic pole teeth are not necessarily arranged in the vertical direction, and one magnetic pole tooth may be arranged in a longitudinal direction.

Fifth Embodiment

<Module Configuration by Outside Parts and Inside Parts>

Figures 26A, 26B, 26C, 26D:
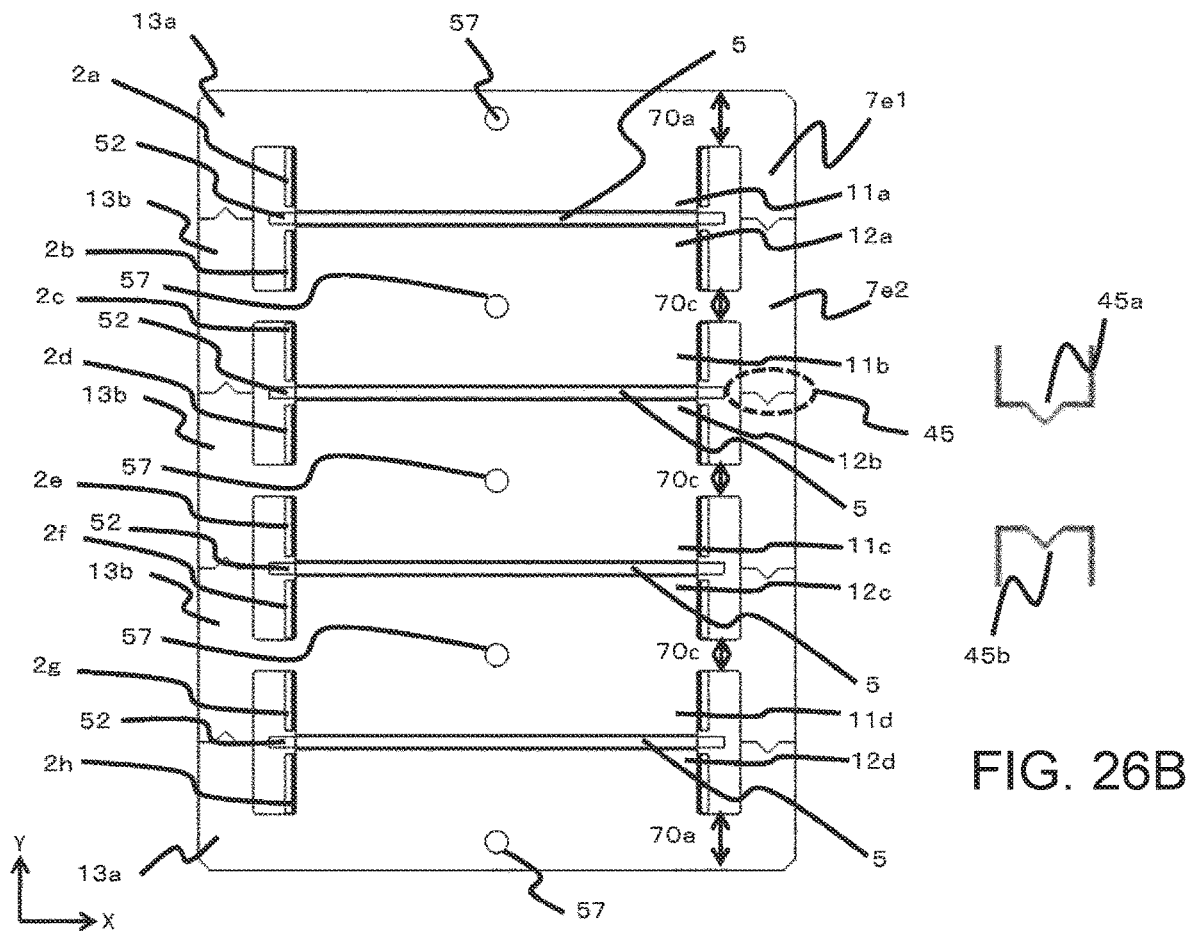
FIG. 26A is an elevational sectional view of a linear motor according to a fifth embodiment in which moving elements are formed in four stages.
FIG. 26B is an enlarged view of a projected line connecting portion 45a and a recessed line connecting portion 45b.
FIG. 26C is a perspective view of a linear motor in which three magnetic pole tooth pairs are included in a longitudinal direction, and moving elements are formed in four stages.
FIG. 26D is a side sectional view of FIG. 26C.

FIGS. 26(a) to 26(d) indicate a fifth embodiment of the linear motor according to the present invention. The linear motor according to the fifth embodiment has a same configuration as in the first to fourth embodiments other than the following points. In the embodiment, a magnetic material 13 can be divided into two-type combinations of outside parts 13a and inside parts 13b. As an example, FIG. 26(a) is an elevational sectional view of a linear motor in which four moving elements are arranged in the Y direction. In the embodiment, directions of magnetic fluxes formed by windings 2a to 2h are the same. By increasing a number of stages, a number ratio of the magnetic path width 70c with respect to the magnetic path width 70a is increased. Therefore, a small scale linear motor can be formed. Further, the magnetic flux formed by each of the windings 2a to 2h passes through each of magnetic pole tooth pairs. Therefore, thrust of the linear motor can be further increased by interaction.

The outside parts 13a is an outermost periphery of the armature 100 illustrated in FIG. 26(a) and is a magnetic material including two outside magnetic pole teeth 11a disposed in an uppermost portion in a longitudinal direction. Further, a magnetic material including adjacent two outside magnetic pole teeth 12d disposed in the lowest portion in a longitudinal direction is also the outside parts 13a, and the magnetic materials have a substantially same shape. Hereinafter, the outside magnetic pole tooth is representatively denoted by 11a. As illustrated in FIGS. 26(c) and 26(d), the outside parts 13a may be a magnetic material including three or more adjacent outside magnetic pole teeth 11a in a longitudinal direction and may be a magnetic material including one outside magnetic pole tooth 11a in a longitudinal direction (not illustrated).

The outside parts 13a includes an iron core 7e1 vertically extending in a lateral direction of the outside magnetic pole tooth 11a. The outside parts 13a connects to the iron core 7e1 by an iron core connecting portion of the magnetic path width 70a. A connecting portion 45 to be described later is included at a tip of the iron core 7e1.

The inside parts 13b is a magnetic material including two lower magnetic pole teeth 12a and two upper magnetic pole teeth 11b which are adjacently arranged in a longitudinal direction. Further, the inside parts includes a magnetic material including two lower magnetic pole teeth 12b and two upper magnetic pole teeth 11c adjacently arranged in a longitudinal direction and a magnetic material including two lower magnetic pole teeth 12c and two upper magnetic pole teeth 11d, and these have a substantially same shape. Hereinafter, the lower magnetic pole tooth is representatively denoted by 12a, and the upper magnetic pole tooth is representatively denoted by 11b. As illustrated in FIGS. 26(c) and 26(d), a magnetic material may include three or more lower magnetic pole tooth 12 and three or more upper magnetic pole tooth 11 adjacently arranged in a longitudinal direction and may be a magnetic material including one outside magnetic pole teeth 11a in a longitudinal direction (not illustrated).

Regarding the inside parts 13b, two lower magnetic pole teeth 12a and two upper magnetic pole teeth 11b are disposed opposite to each other in a vertical direction. Further, the inside parts 13b includes a vertically extending iron core 7e2 in a lateral direction of the lower magnetic pole tooth 12a and the upper magnetic pole tooth 11b. The inside parts 13b connects to the iron core 7e2 by an iron core connecting portion of the magnetic path width 70c. A connecting portion 45 to be described later is included at two tips of the iron core 7e2. These four magnetic pole teeth form a part of or all of a magnetic circuit by being connected by a magnetic material.

A vertical length of the fixing hole 57 of the inside parts is set to smaller than a vertical length (magnetic path width) 70c of the iron core connecting portion. As a result, it is prevented that the winding 2 is overlapped with the fixing hole 57, and assemblability can be improved. Further, as described above, the fixing hole 57 is preferably provided near a center in a lateral direction. A shape of the fixing hole 57 may be a flat shape in the lateral direction. In this case, the inside parts can be fixed while minimizing the magnetic path width 70c. The magnetic path width 70c at least sufficiently supports a portion where the lower magnetic pole tooth 12a and the upper magnetic pole tooth 11b of the inner parts are provided.

By combining and connecting the outside parts 13a and the inside parts 13b, the magnetic material 13 and a magnetic pole tooth pair of the armature 100 can be formed. Specifically, in the embodiment, parts forming a magnetic path can be formed by magnetic materials 13a and 13b having two-type shapes. In the case where the outside parts and the inside parts are formed by laminating electromagnetic steel sheets, since a magnetic pole tooth is flat, the parts can be formed by using a few types of steel sheets.

<Connecting Portion>

Each of the outside parts 13a and the inside parts 13b include a connecting portion 45. The outside parts 13a and the inside parts 13b or the inside parts 13b each other can be connected by the connecting portion 45. With reference to FIGS. 26(a) to 26(d), the connecting portion will be described in detail later. The outside parts 13a and the inside parts 13b include either or both of a first-shape connecting portion and a second-shape connecting portion which can fit each other as the connecting portion 45. In the embodiment, the outside parts 13a and the inside parts 13b include both of a projected line connecting portion 45a as the first-shape connecting portion and a recessed line connecting portion 45b as the second-shape connecting portion. By connecting the two parts, a member including magnetic pole tooth pairs disposed opposite to each other via a space is formed. Specifically, a region can be formed in which one moving element can drive.

The outside parts 13a according to the embodiment can be connected to both of a first surface and a second surface of the inside parts 13a. Further, each of a first surface and a second surface of the inside parts can be connected to the first surface and the second surface of the other inside parts 13a. Furthermore, the outside parts 13b can be connected each other.

As described above, the magnetic material 13 and a magnetic pole tooth pair of the armature 100 can be formed by combining and connecting two outside parts 13a and one or more or two or more inside parts 13b.

Therefore, by adjusting a number of the inside parts 13b forming the armature 100, a number of moving elements of a linear motor can be easily adjusted. As a result, a user determines a number of the moving elements included in the linear motor.

A linear motor having different thrust (a number of stages of moving elements of a linear motor) by a multistage configuration by using a few types of parts can be provided as the linear motor according to the embodiment. Therefore, a production line can be shared, and time and costs for parts design can be significantly reduced. Further, a number of the inner peripheral magnetic path widths 70c, which is narrower than the outermost peripheral magnetic path width 70a, is increased. Therefore, while obtaining large thrust by the multistage configuration, downsizing can be realized.

<Projected and Recessed Line Connecting Portion>

FIG. 26(b) is an enlarged view of a projected line connecting portion 45a and a recessed line connecting portion 45b. Connection between parts can be simplified by the connecting portion 45, and productivity when a linear motor is assembled is improved. The connecting portions are a projected line shape and a recessed line shape. Therefore, when the outside parts and the inside parts are manufactured by using such as laminated steel plates, a number of types of the steel plates can be minimized. Specifically, by laminating a plurality of steel plates including projected connecting portions and recessed connecting portions, a projected line connecting portion and a recessed line connecting portion are formed.

The connecting portion 45 has a same shape along a longitudinal direction and is not especially limited in the case where the shapes are formed in two types which can fit each other.

<Symmetry>

The outside parts 13a and the inside parts 13b are substantially rectangular shape in a plan view (Y direction view), and the projected line connecting portion 45a and the recessed line connecting portion 45b are included on the outside of magnetic pole teeth. Further, the inside parts 13b includes the projected line connecting portion 45a and the recessed line connecting portion 45b on the outside of a magnetic pole tooth and includes the projected connecting portion 45a and the recessed connecting portion 45b on the outside of a magnetic pole tooth disposed on an opposite side of the above magnetic pole tooth. More specifically, types of the connecting portions 45 adjacent in a vertical direction or a lateral direction are different, and types of the connecting portions 45 disposed diagonally opposite are the same. As a result, the inside parts 13b other than the connecting portion 45 is dyad symmetry when a lateral direction, a vertical direction, and a longitudinal direction are a rotation axis. Specifically, when the inside parts 13b is half rotated around any of the X, Y, and Z axes, the inside parts 13b other than the connecting portion 45 have a substantially same shape as an original shape. A type of the connecting portion 45 is changed by half-rotation. For example, when the inside parts 13b according to the embodiment is half rotated around the Y axis, the recessed connecting portion 45b is positioned where the projected connecting portion 45a has been positioned before the half rotation, and the projected connecting portion 45a is positioned where the recessed connecting portion 45b has been positioned. Specifically, in the case where the inside parts 13b according to the embodiment is half rotated around a predetermined axis, a shape of the parts before and after the half rotation are substantially same. Further, before and after the rotation, a position of the projected connecting portion 45a and a position of the recessed connecting portion 45b are exchanged. The position exchange by the half rotation around the X axis is because types of the connecting portions 45 adjacent in a vertical direction are different. The position exchange by the half rotation around the Y axis is because types of the connecting portions 45 adjacent in a lateral direction are different.

The outside parts 13a other than the connecting portion 45 is also dyad symmetry when the vertical (Y) direction is a rotation axis. Further, since types of the connecting portions 45 adjacent in a lateral direction are different, the types of the connecting portion 45 are exchanged by half-rotating around the Y axis.

Specifically, in the embodiment, in the case where a person who assembles holds two parts in a direction in which the connecting portions 45 of the parts are not corresponding each other when connecting the two parts, types of the connecting portions 45 positioned at the same portion can be changed by half-rotating around a predetermined axis. As a result, assemblability can be improved.

<Relation of Number of Turns of Winding>

Each of vertically arranged windings 2 supplies magnetic flux in a same direction. Here, in each of the magnetic pole teeth 11 and 12 disposed in a vertical direction of the armature 100 according to the embodiment illustrated in FIG. 26(a), a sum of a number of turns of the windings 2a, 2b, 2c, and 2d provided on an upper side from a center is preferably substantially equal to a sum of a number of turns of the windings 2e, 2f, 2g, and 2h provided on a lower side from the center in the vertical direction. In other words, the armature 100 according to the embodiment includes four magnetic pole tooth pairs and therefore includes 2×4 magnetic pole teeth, specifically total eight magnetic pole teeth. Therefore, a number of turns of windings wound around first to fourth four magnetic pole teeth from an uppermost stage and a number of turns of windings wound around the other four magnetic pole teeth are preferably substantially equal. In this manner, it becomes easy to balance vertical forces applied to each moving element.

Further in general, when a number of the magnetic pole teeth arranged in a vertical direction is 2n (n is a positive integer), a number of turns of windings around total n magnetic pole teeth counted downward from the uppermost magnetic tooth of an armature and a total number of turns of windings around the other n magnetic pole tooth are substantially equal. In consideration of multistage configuration according to the embodiment, "n" is preferably an integer of 2 or lager.

Further, a number of turns of the windings 2a, 2c, 2e, and 2g provided to upper magnetic pole teeth of a magnetic pole tooth pair according to the embodiment are preferably substantially equal to numbers of turns of the windings 2b, 2d, 2f, and 2h provided to lower magnetic pole teeth of the magnetic pole tooth pair, respectively. In this manner, it becomes easy to balance vertical forces applied to each moving element.

A number of turns may be counted actually, may measure a length of a winding by linearly extending the winding, or may convert to a ratio of the length by measuring electric resistance.

A plurality of moving elements arranged in a vertical direction may be mechanically connected. For example, a plurality of the moving elements can be connected by providing a connecting portion at longitudinal ends of a moving element. In this case, all of the moving elements may be connected and may be symmetrically connected in a vertical direction. Symmetrically connecting in a vertical direction means, for example, connecting ath moving element, and (M−a+1)th moving element when moving elements are numbered as 1, 2, . . . M from the top. However, "a" is an integer of 1<a<(M/2).

Sixth Embodiment

FIG. 27 indicates a sixth embodiment of the linear motor according to the present invention. The linear motor according to the sixth embodiment has a same configuration as in the first to fifth embodiments other than the following points. The linear motor according to the embodiment is a linear motor capable of three-phase driving by one armature and indicates an example in which upper magnetic pole teeth, lower magnetic pole teeth, a magnetic material for connecting the lower magnetic pole teeth and the upper magnetic pole teeth are formed by using laminated steel sheets. By adjusting a number of laminated steel sheets, a thickness in the Z direction of a magnetic pole tooth can be changed. Further, by changing the thickness in the Z direction of the magnetic pole tooth by changing a pitch and a size of a permanent magnet 5 and a permanent magnet of a permanent magnet holding member 52, a design in which an induced voltage generated to a winding by thrust and a magnet is changed can be realized by adjusting a number of laminated steel sheets.

Seventh Embodiment

Figure 28:
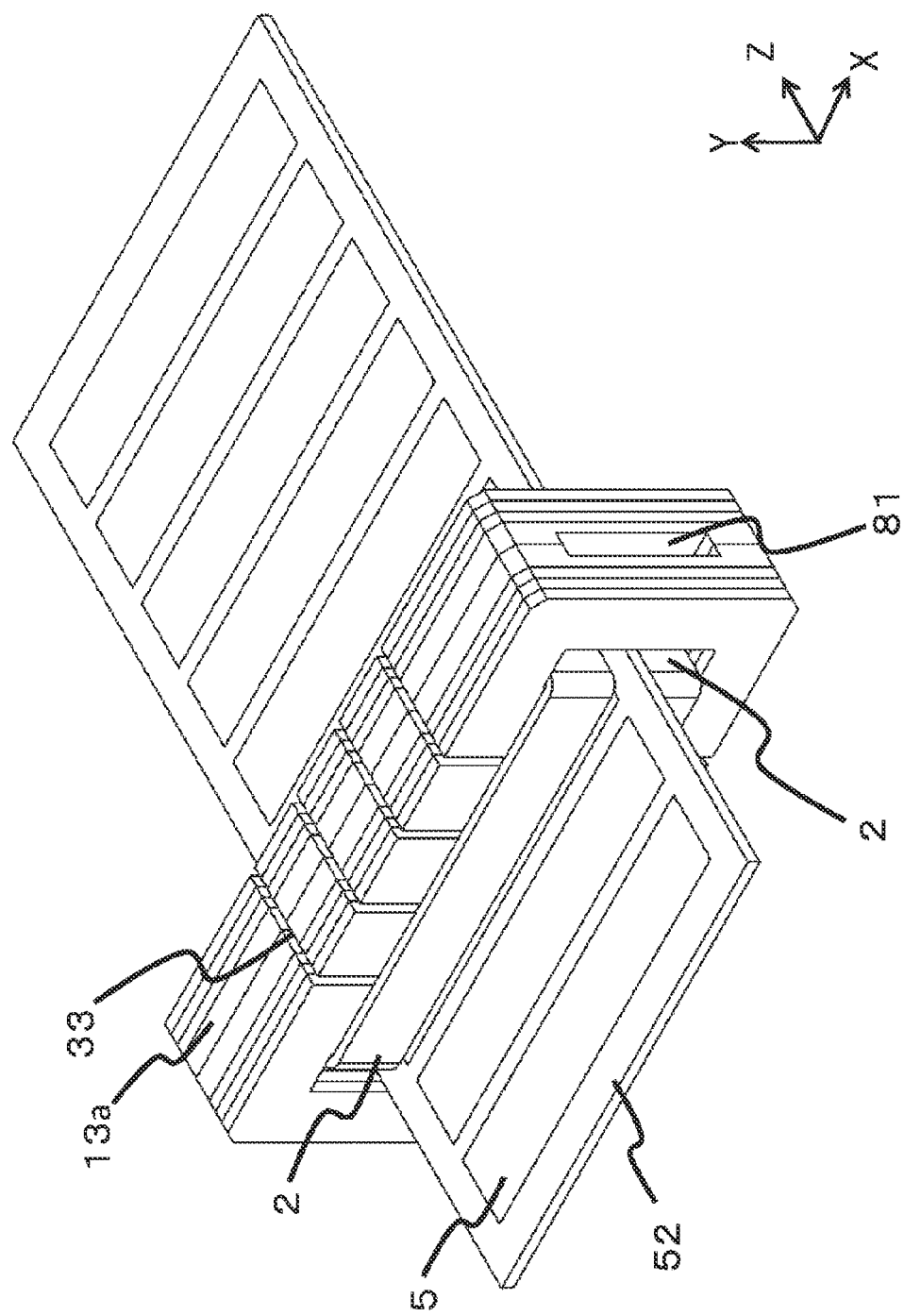
FIG. 28 is a view illustrating an example of a linear motor in which a magnetic material is integrated with a magnetic pole tooth.

FIG. 28 indicates a seventh embodiment of the linear motor according to the present invention. The linear motor according to the seventh embodiment has a same configuration as in the first to sixth embodiments other than the following points. The linear motor according to the embodiment is a linear motor capable of three-phase driving by three armatures and is an example in which upper magnetic pole teeth, lower magnetic pole teeth, and a magnetic material connecting the upper magnetic pole teeth and the lower magnetic pole teeth and forming a path of a magnetic flux are formed by using laminated steel sheets. In the example, a magnetic material 13a for connecting magnetic pole teeth adjacently disposed in the Z direction is integrally formed with the magnetic pole teeth. In the example, the magnetic pole teeth and the magnetic material 13a are integrated to avoid decomposition of parts of the magnetic material 13a by a slit 33. According to this configuration, a number of parts can be reduced.

Eighth Embodiment

Figure 29:
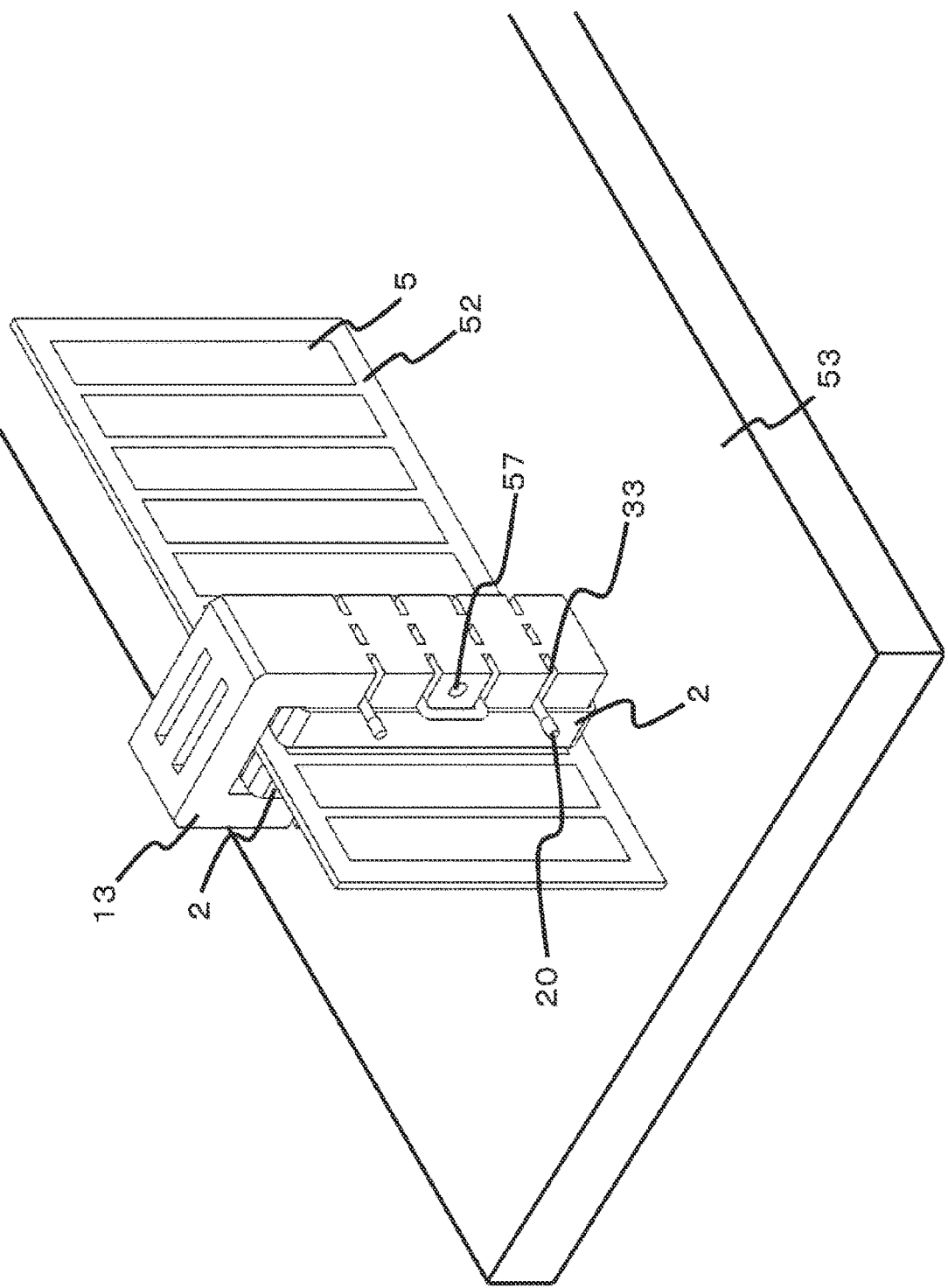
FIG. 29 is a view illustrating an example off a linear motor in which a magnetic material is disposed on one side with respect to a moving element.
Figure 30:
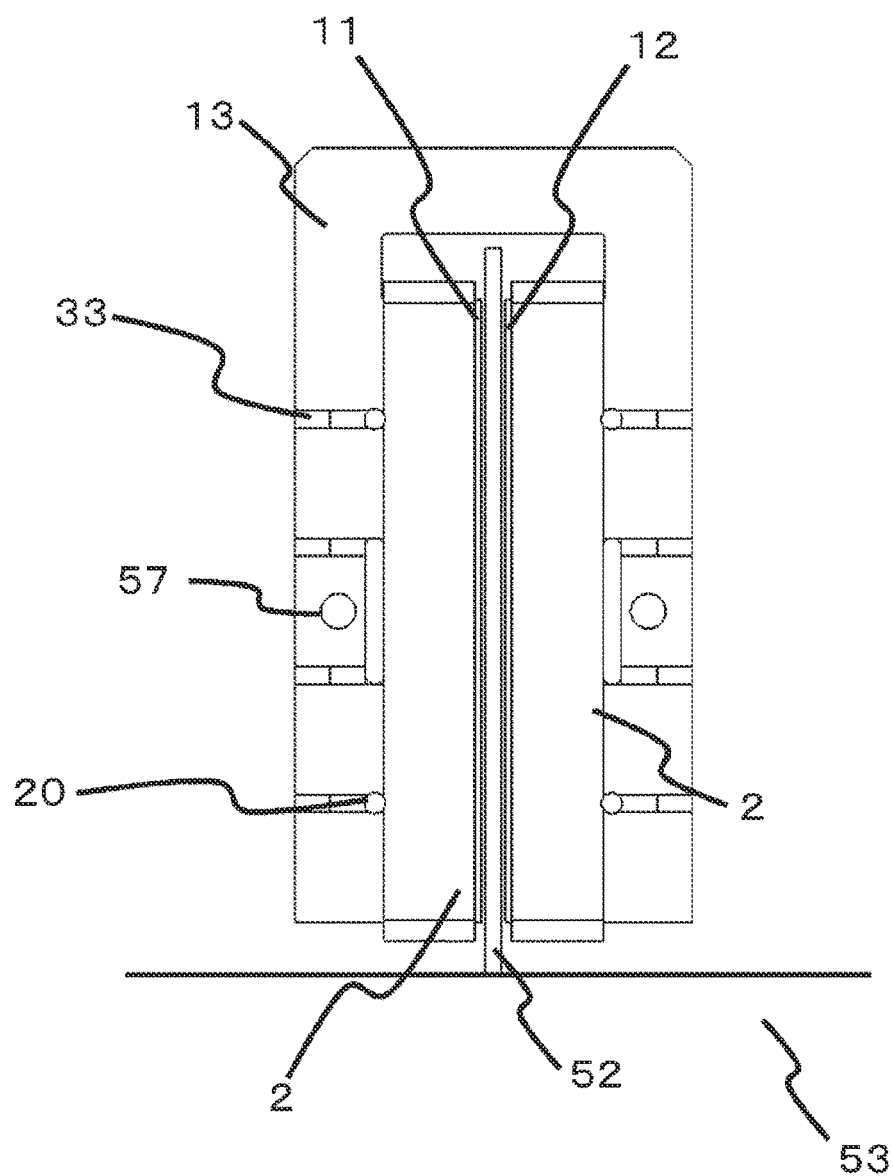
FIG. 30 is a view illustrating a fixing example of the linear motor illustrated in FIG. 29.

FIGS. 29 and 30 indicate a seventh embodiment of the linear motor according to the present invention. The linear motor according to the eighth embodiment has a same configuration as in the first to seventh embodiments other than the following points. The embodiment indicates an example that a magnetic material connecting upper magnetic pole teeth and lower magnetic pole teeth and forming a path of a magnetic flux forms the path of the magnetic flux on one side of a moving element (an upper direction on the drawing according to the embodiment). As described above, moving elements are fixed to such as a base 53, and an armature side can be moved, by providing a magnetic material connecting upper magnetic pole teeth and lower magnetic pole teeth and forming a path of a magnetic flux on one side.

Ninth Embodiment

In the ninth embodiment, as an example of an apparatus using the linear motor according to the present invention, a hermetic compressor 350 and a refrigerator mounting the hermetic compressor 350 are indicated.

Figure 31:
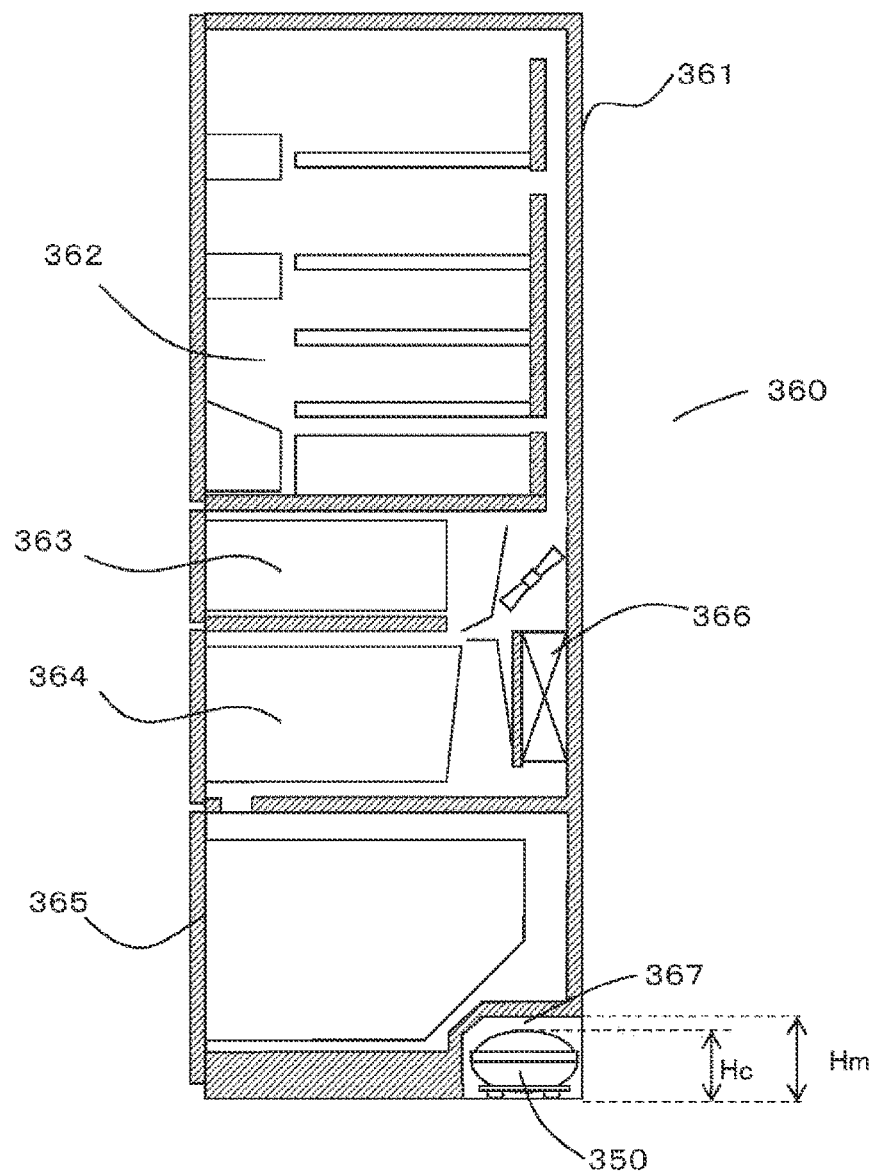
FIG. 31 is a schematic sectional view illustrating an example of a positional relation in a refrigerator mounting a hermetic compressor.
Figure 32:
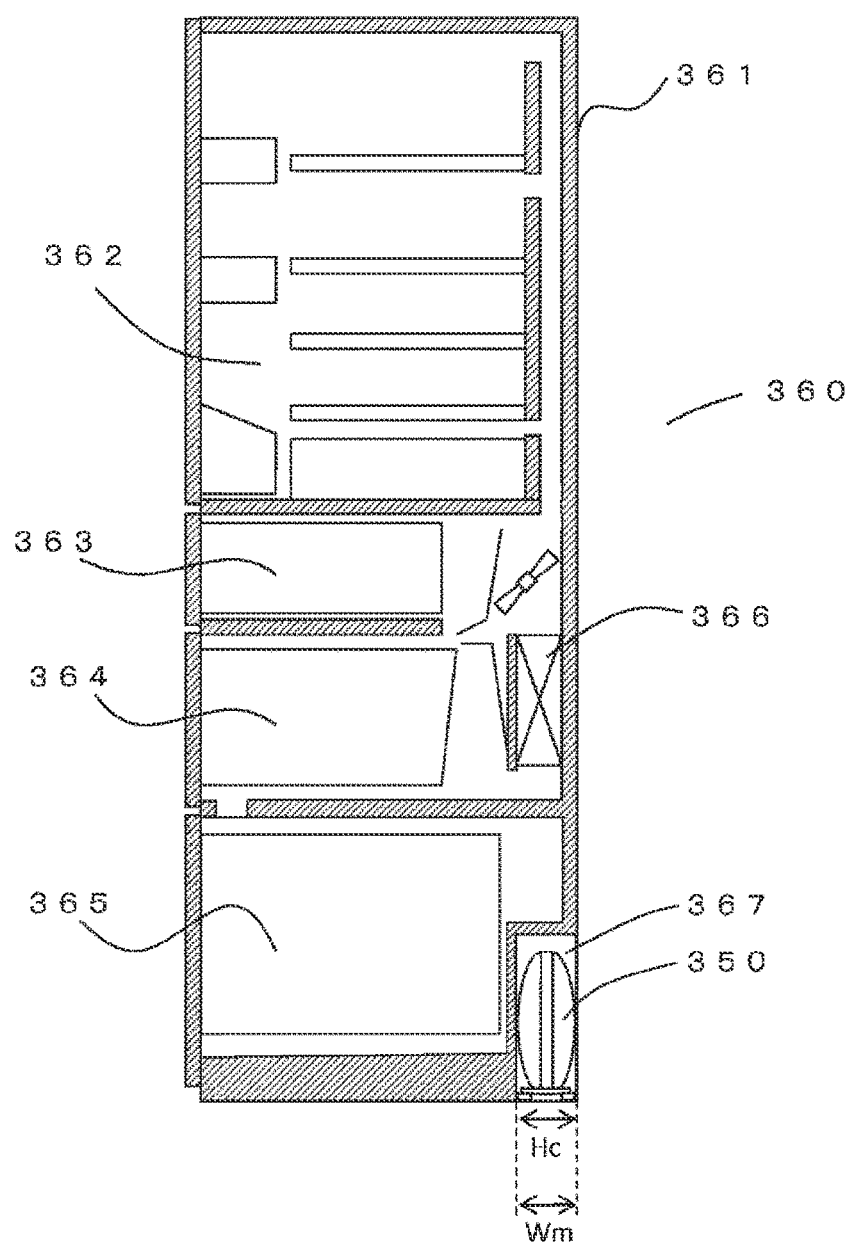
FIG. 32 is a schematic sectional view illustrating another example of the positional relation in the refrigerator mounting a hermetic compressor.

FIGS. 31 and 32 are a schematic sectional view of a refrigerator 360 mounting the hermetic compressor 350 including the linear motor according to the embodiment. The refrigerator 360 includes a refrigeration chamber 362, an upper freezing chamber 363, a lower freezing chamber 364, a vegetable chamber 365, and a machine chamber 367. The hermetic compressor 350 is disposed in the machine chamber 367. A positional relation of the refrigeration chamber 362, the upper freezing chamber 363, the lower freezing chamber 364, the vegetable chamber 365, and the machine chamber 367 is not limited to FIGS. 31 and 32. A height dimension Hc of the hermetic compressor 350 can be designed low. Therefore, as illustrated in FIG. 31, in the case where the hermetic compressor 350 is disposed such that a height direction of the hermetic compressor 350 comes to the gravity direction, a height dimension Hm of the machine chamber 367 can be reduced, and a volume of the vegetable chamber 365 can be increased.

Further, as illustrated in FIG. 32, in the case where the hermetic compressor 350 is disposed such that a height direction of the hermetic compressor 350 comes to a horizontal direction, a width dimension Wm of the machine chamber 367 can be reduced, and a volume of the vegetable chamber 365 can be increased.

Furthermore, the hermetic compressor 350 is disposed on a rear side of the vegetable chamber 365. However, in the case where the hermetic compressor 350 is disposed on such as a rear side of the refrigeration chamber 362 which is different from the above, a space in the freezing device can be effectively used according to the embodiment in which the height dimension Hc of the hermetic compressor 350 can be designed low.

As described above, in the case where the hermetic compressor 350 according to the embodiment is used in the freezing device such as a refrigeration chamber, since the hermetic compressor 350 is a small size, a storage space of the freezing device can be increased without changing a size of the freezing device. Further, by downsizing the freezing device, a space can be saved.

Tenth Embodiment

Figure 33:
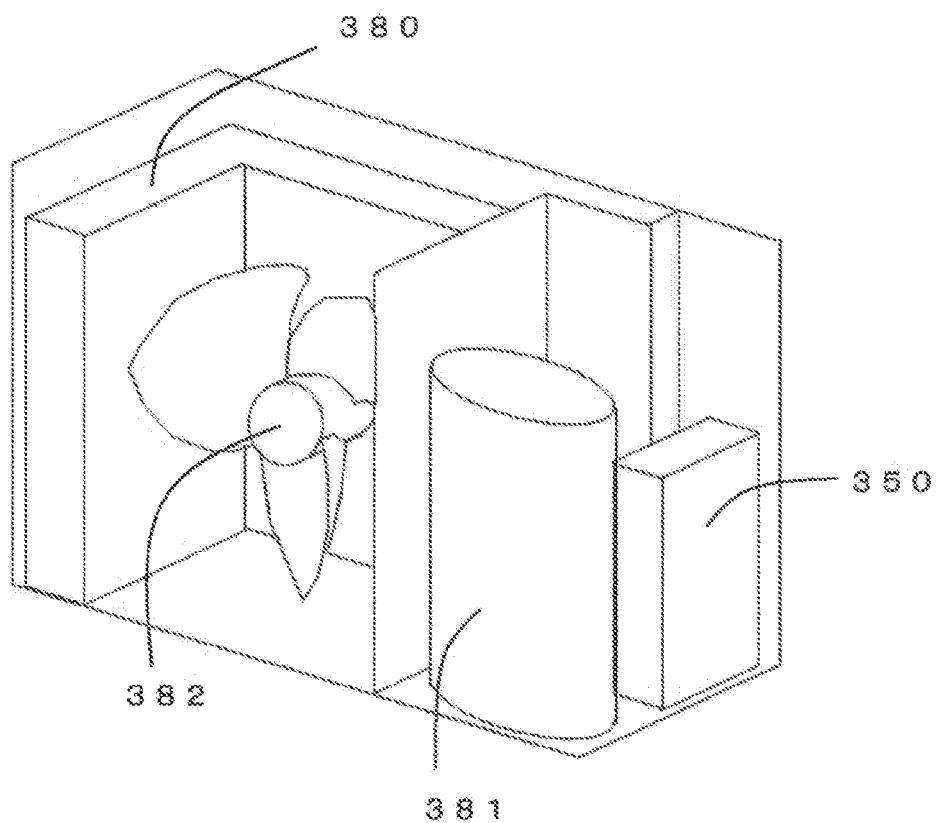
FIG. 33 is a view illustrating an example of a configuration of a heat pump unit in a heat pump water heater.
Figure 34:
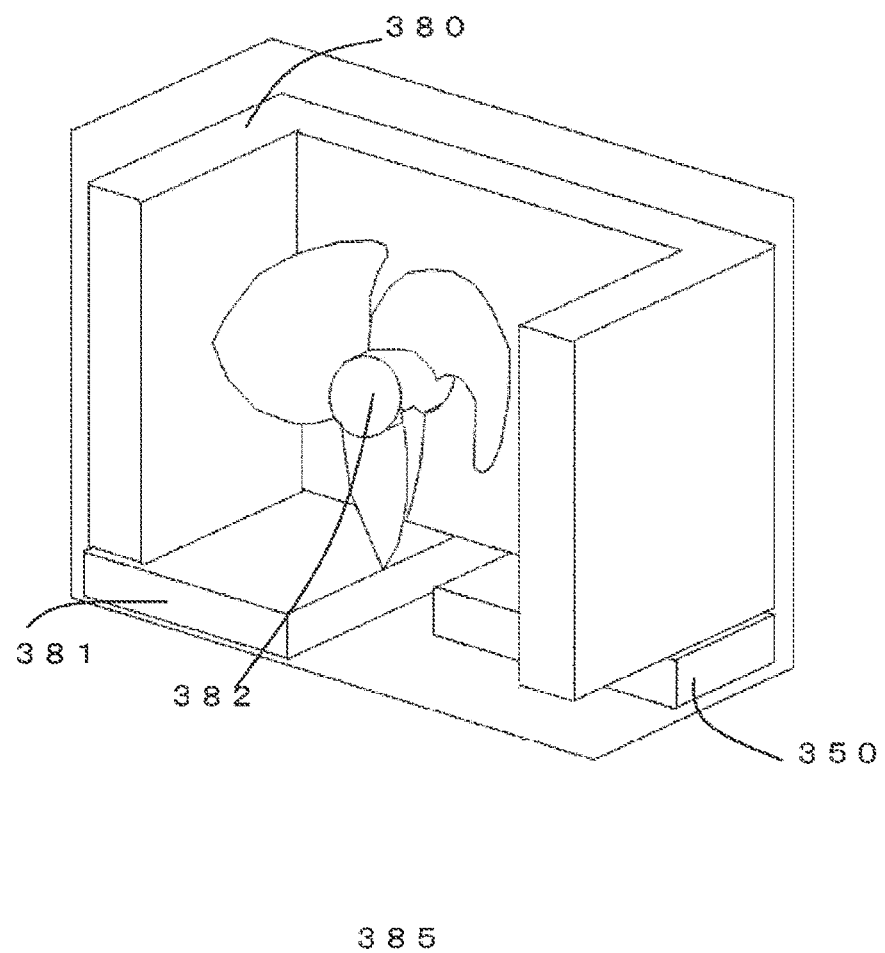
FIG. 34 is a view illustrating another example of the configuration of the heat pump unit in a heat pump water heater.

In the tenth embodiment, as an example of an apparatus mounting a linear motor according to the present invention, a heat pump mounts a hermetic compressor 350. FIGS. 33 and 34 are a schematic view of a heat pump unit 385 in a heat pump water heater. The heat pump unit 385 includes the hermetic compressor 350 mounting the linear motor indicated in the embodiment, a fan 382, a heat exchanger 380, and a water heater heat exchanger 381. A refrigerant compressed by the hermetic compressor 350 heats water by the water heater heat exchanger 381, passes through an inflation valve (not illustrated), evaporates in the heat exchanger 380, and returns to the hermetic compressor 350. The water heater heat exchanger 381 may be disposed beside the fan 382 or on a lower side of the fan 382 as illustrated in FIG. 33.

In the case where the hermetic compressor 350 according to the embodiment is used in the heat pump unit 385, a size of the heat pump unit 385 can be reduced by the principal in the case of using the hermetic compressor 350 in the refrigerator 360. Further, by using that the height dimension Hc of the hermetic compressor 350 is small, the dimension of the heat exchanger 380 and the water heater heat exchanger 381 can be increased without changing an external dimension of the heat pump unit 385. Therefore, the heat exchanger 380 and the water heater heat exchanger 381 can be further freely designed and can be efficiently designed.

Eleventh Embodiment

Figure 35:
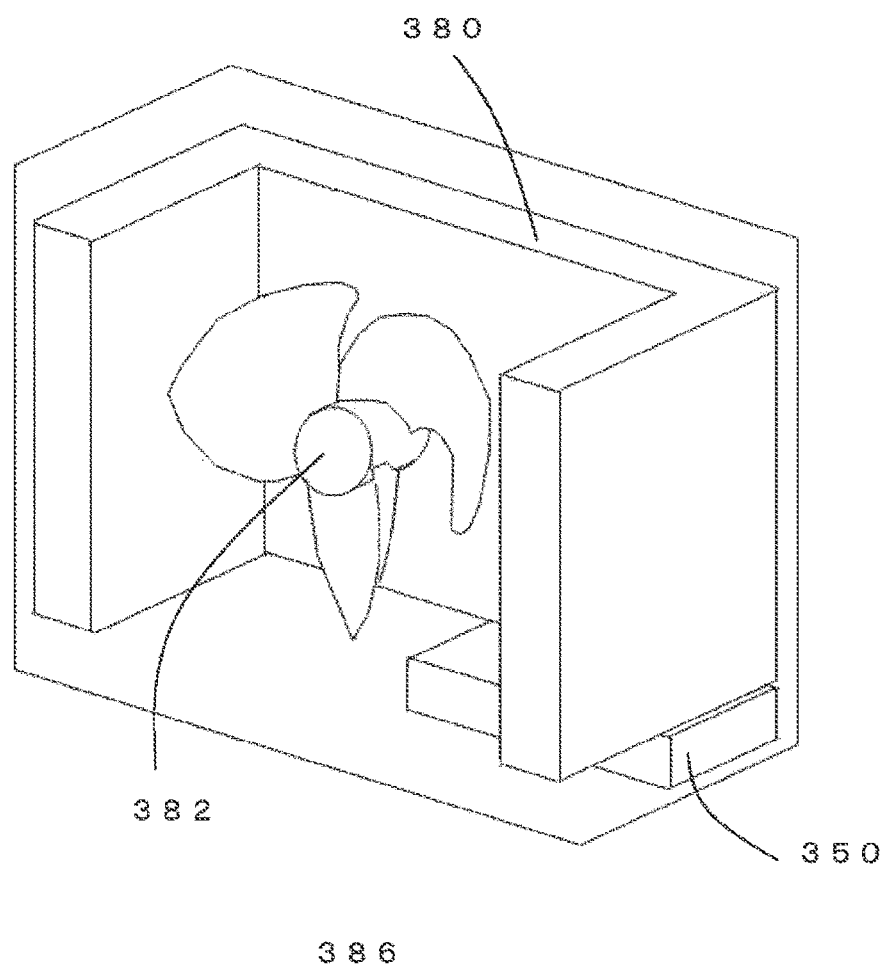
FIG. 35 is a view illustrating a configuration example of an outdoor unit of an air conditioner.

In an eleventh embodiment, as an example of an apparatus mounting the linear motor according to the present invention, an air conditioner mounting a hermetic compressor 350 is indicated. FIG. 35 is a schematic view of an outdoor unit 386 of the air conditioner. The outdoor unit 386 includes the hermetic compressor 350, a fan 382, and a heat exchanger 380. In FIG. 35, the hermetic compressor 350 is disposed on a lower side of the fan 382. However, a positional relation between the hermetic compressor 350 and the fan 382 are not limited thereto.

In the case where the hermetic compressor 350 is used in an air conditioner, since the hermetic compressor 350 is a small size, a dimension of the outdoor unit 386 can be reduced. Further, as in the case where the hermetic compressor is used in a heat pump unit 385, a dimension of the heat exchanger 380 can be increased without changing a dimension of the outside unit 386. Therefore, the heat exchanger 380 can be further freely designed and further efficiently designed.

Twelfth Embodiment

Figure 36:
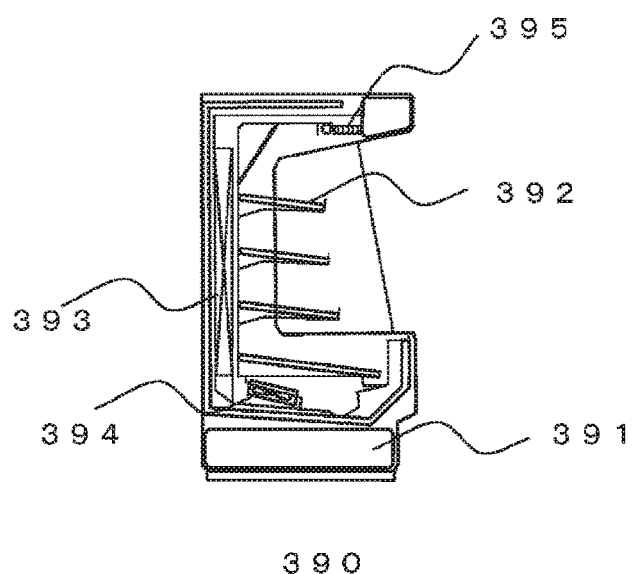
FIG. 36 is a view illustrating a configuration example of a show case having freezing/refrigerating functions.
Figure 37:
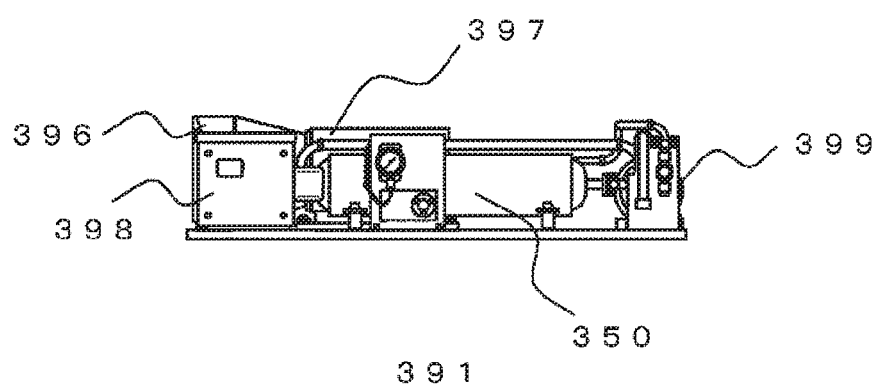
FIG. 37 is a view illustrating a configuration example of a condensing unit.

In an twelfth embodiment, as an example of an apparatus mounting the linear motor according to the present invention, a showcase mounting a hermetic compressor 350 is indicated. FIG. 36 is a schematic view of a show case 390 having freezing and refrigerating functions. A condensing unit 391 is disposed on a lower side of a product shelf 392, and an evaporator 393 is arranged on a back surface of a show case 390. Air cooled by the evaporator 393 is sent to the product shelf 392 from a cooling air duct 395. FIG. 37 is a schematic configuration view of the condensing unit 391. The condensing unit 391 includes the hermetic compressor 350, a heat exchanger 396, a fan 397, an electric component box 398, and an accumulator 399.

When the hermetic compressor 350 is especially small in a height direction, the overall height of the condensing unit 391 can be lowered. Therefore, without changing a dimension of the show case 390, a height dimension of the product shelf 392 can be increased. Further, when the hermetic compressor 350 is a small size, the inside of the condensing unit 391 is ventilated, and heat can be efficiently exchanged by the heat exchanger 396.

Thirteenth Embodiment

Figure 38:
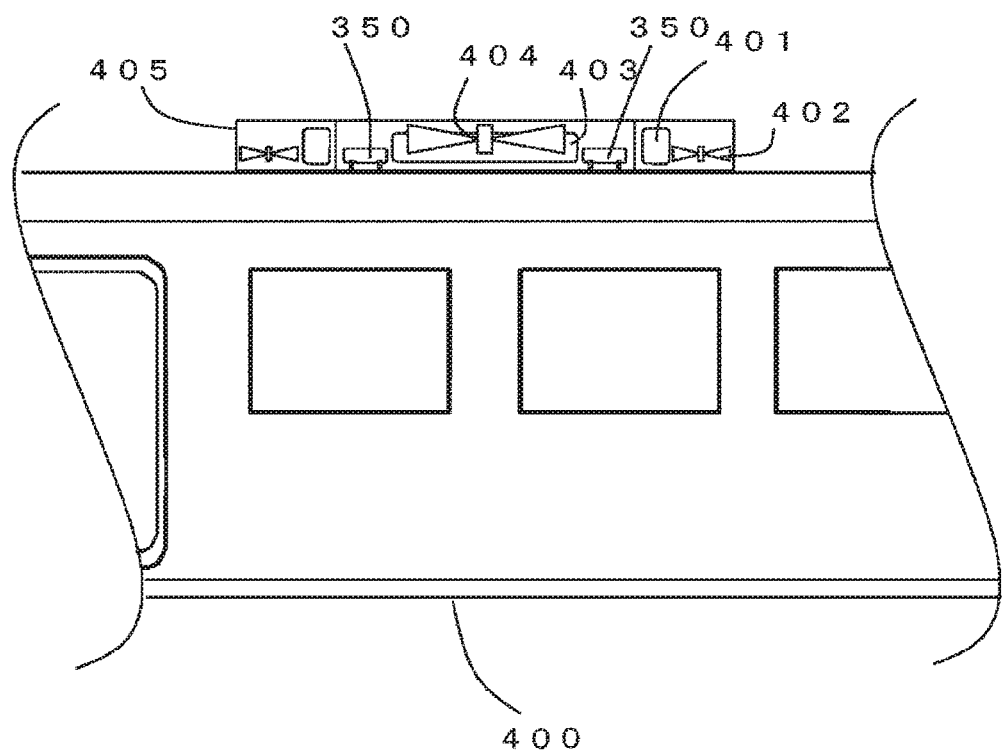
FIG. 38 is a view illustrating a configuration example a vehicle air conditioner disposed on a ceiling of a railway vehicle.

In a thirteenth embodiment, as an example of an apparatus mounting the linear motor according to the present invention, a vehicle air conditioner mounting a hermetic compressor 350 is indicated. FIG. 38 is a schematic view of a vehicle air conditioner 405 disposed on a ceiling of a railway vehicle 400. The vehicle air conditioner 405 includes the hermetic compressor 350, an outdoor side heat exchanger 403, an outdoor side fan 404, an indoor side heat exchanger 401, and an indoor side fan 402. Since the hermetic compressor 350 is a small size, especially can be downsized in a height direction, the overall height of the vehicle air conditioner 405 can be reduced. The overall height of the vehicle air conditioner 405 is preferably low from the viewpoint of air resistance of the railway vehicle 400. Further, in the case of the railway vehicle 400 traveling in a tunnel such as underground, in consideration of a restriction in a height direction of the tunnel, a cabin space can be widened when the overall height of the vehicle air conditioner 405 is low. Further, when the hermetic compressor 350 is a small size, the inside of the vehicle air conditioner 405 is ventilated, and heat can be efficiently exchanged by the outdoor side heat exchanger 403.

Fourteenth Embodiment

Figure 39:
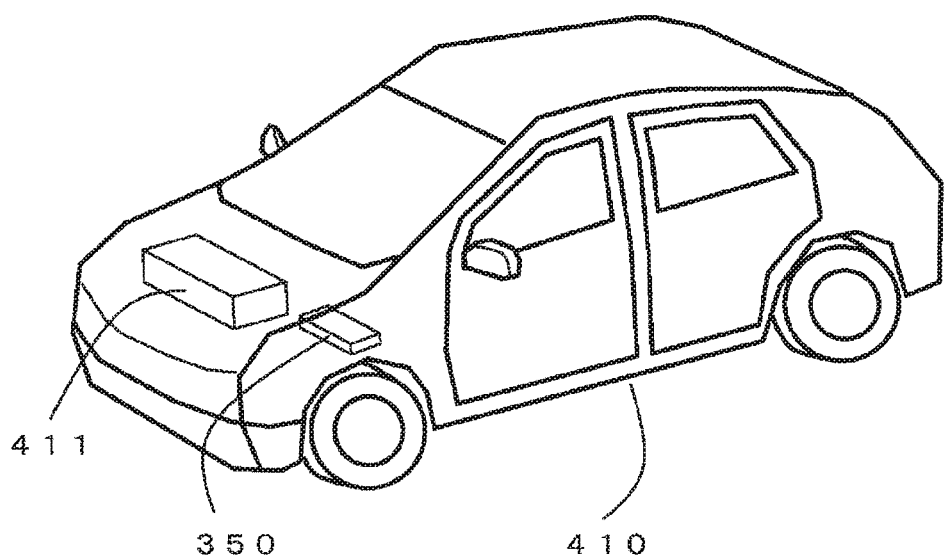
FIG. 39 is a view illustrating a configuration example of an automobile mounting a hermetic compressor for in-vehicle air conditioning.

In a fourteenth embodiment, as an example of an apparatus mounting the linear motor according to the present invention, an automobile mounting a hermetic compressor 350 is indicated. FIG. 39 is a schematic view of an automobile 410 mounting the hermetic compressor 350 for in-vehicle air conditioning. A setting position of the hermetic compressor 350 is not limited to the above. When the hermetic compressor 350 is a small size, the automobile 410 in which a cabin space is widened can be designed.

In the first to fourth embodiments of the present invention, a space for passing through such as a winding wire is provided on a side of an armature. However, the present invention is not limited by whether or not to provide the hole.

In the first to seventh embodiments according to the invention, a magnetic material connecting an upper magnetic pole tooth and a lower magnetic pole tooth is disposed on both sides of a moving element so as to surround the moving element. However, similar effects can be obtained in the case where the magnetic material is disposed on one side.

Although a holding method of a positional relation between a permanent magnet, a permanent magnet holding member, and an armature is not described in the embodiments of the present invention, a support structure similar to a conventional linear motor (for example, a linear guide, a guide roller, and a cam follower) can be used.

The present invention is not limited to the above-described embodiments and includes various variations. For example, the above-described embodiments describe the present invention in detail for clarification, and every configurations described above may not be necessarily included. Further, a configuration of each embodiment can be partially replaced to configurations of the other embodiments. Furthermore, a configuration of each embodiment can be added to configurations of the other embodiments. Further, a part of a configuration of each embodiment can be added to, deleted from, and replaced from other configurations.

<Other Idea Disclosed in Present Invention>

The present invention includes technical ideas described below.

<<Appendix 1>>

A linear motor, including:

an armature including a first magnetic pole tooth pair and a second magnetic pole tooth pair which are two magnetic pole teeth disposed opposite to each other via a space in a vertical direction and the armature in which the first and second magnetic pole tooth pairs are arranged in a longitudinal direction; and an moving element which relatively moves in a longitudinal direction with respect to the armature, wherein each of the magnetic pole teeth of the first and second magnetic pole tooth pairs is connected by a magnetic material, a first winding wound around the magnetic pole teeth of either or both of the first magnetic pole tooth pair and a second winding wound around the magnetic pole teeth of either or both of the second magnetic pole tooth pair are included, and the magnetic material includes an electric resistance unit having a larger electric resistance value than an electric resistance value of the magnetic material along a longitudinal direction.

According to appendix 1, a linear motor can be provided which can effectively use a magnetic flux between magnetic poles adjacent in a longitudinal direction and can reduce a loss of the magnetic flux. Further, a small-scale linear motor can be provided.

<<Appendix 2>>

The linear motor according to appendix 1, wherein directions of magnetic fluxes supplied from the first and second windings are opposite each other, and the electric resistance unit is radially provided.

According to appendix 2, a linear motor in which a loss is reduced can be provided. Further, a linear motor which realizes single-phase driving or three-phase driving by three armatures is especially suitable.

<<Appendix 3>>

The linear motor according to appendix 1, wherein the armature includes a third magnetic pole tooth pair including two magnetic pole teeth disposed opposite to each other via a space in a vertical direction, the third magnetic pole tooth pair is connected to the magnetic material and arranged in a longitudinal direction with respect to the first and second magnetic pole tooth pairs, the third magnetic pole tooth pair includes a third winding wound around either or both of the magnetic pole teeth, one of the first, second, and third windings supplies a magnetic flux opposed to at least one of two other windings, and the electric resistance unit is radially provided.

According to appendix 3, a linear motor in which a loss is reduced can be provided. In addition, a linear motor which realizes three-phase driving by one armature is especially suitable.

<<Appendix 4>>

The linear motor according any one of appendixes 1 to 3, wherein the electric resistance unit is a slit provided with a predetermined depth to the magnetic material along a longitudinal direction, and a cooling pipe is provided to the slit.

According to appendix 4, while realizing downsizing a linear motor, cooling performance can be improved.

<<Appendix 5>>

The linear motor according to appendix 4, wherein the slit has a depth to reach the inside of the volume surrounded by the first winding or the second winding wound around magnetic pole teeth.

According to appendix 5, cooling performance of the winding can be improved.

<<Appendix 6>>

The linear motor according to appendix 4 or 5, wherein the cooling pipe comes into contact with the winding.

According to appendix 6, cooling performance of the winding can be improved.

<<Appendix 7>>

The linear motor according to any one of appendixes 1 to 6, a communication hole for communicating the winding with the outside of the magnetic material.

According to appendix 7, cooling performance of the winding can be improved.

<<Appendix 8>>

An apparatus mounting the linear motor according to any one of appendixes 1 to 7.

According to appendix 8, an apparatus can be provided which includes a linear motor according to any one of appendixes 1 to 7 and obtains effects on the linear motor.

REFERENCE SIGNS LIST 2a, 2b, 2c, 2d, 2e, 2f, 2g, 2h winding
5, 5a, 5b permanent magnet
7e1, 7e2 iron core
11, 11a, 11b, 11c, 11a1, 11a2, 11a3 upper magnetic pole tooth
12, 12a, 12b, 12c, 12a1, 12a2, 12a3 lower magnetic pole tooth
13, 13a, 13b, 13c magnetic material
20 cooling pipe
33 slit (electric resistance unit)
40 winding depth
41 slit depth
45 connecting portion
51 magnetization direction of permanent magnet
52 permanent magnet holding member
53 base plate
55 moving element
56 connecting plate
57 fixing hole
58 iron core connecting portion
61a, 61b, 61c, 61d magnetic flux
70a, 70b, 70c magnetic path width
71, 72 magnetic flux
81, 81a, 81b communication hole
85 moving member supporting tool
91 driving apparatus
100, 101, 102 armature
200, 201 linear motor
350 hermetic compressor
360 refrigerator
361 refrigerator body
362 refrigeration chamber
363 upper freezing chamber
364 lower freezing chamber
365 vegetable chamber
366 cooler
367 machine chamber
380 heat exchanger
381 water heater heat exchanger
382 fan
385 heat pump unit
386 outdoor unit
390 show case
391 condensing unit
392 product shelf
393 evaporator
394 fan
395 cooling air duct
396 heat exchanger
397 fan
398 electric component box
399 accumulator
400 railway vehicle
401 indoor side heat exchanger
402 indoor side fan
403 outdoor side heat exchanger
404 outdoor side fan
405 vehicle air conditioner 410 automobile
411 heat exchanger

The invention claimed is:

1. A linear motor, comprising an upper moving element which relatively moves in a longitudinal direction with respect to an armature and a lower moving element provided lower than the upper moving element, wherein the armature comprises:
   an upper first magnetic pole tooth pair including two magnetic pole teeth disposed opposite to each other in a vertical direction via a space in which the upper moving element can relatively move;
   a lower first magnetic pole tooth pair including two magnetic pole teeth disposed opposite to each other in a vertical direction via a space in which the lower moving element can relatively move,
   outside parts including an upper magnetic pole tooth of the upper first magnetic pole tooth pair;
   inside parts including a lower magnetic pole tooth of the upper first magnetic pole tooth pair and an upper magnetic pole tooth of the lower first magnetic pole tooth pair; and
   a lower magnetic pole tooth of the lower first magnetic pole tooth pair, and
   the armature can be divided into parts having substantially same shapes with the outside parts;
   the armature has a shape such that two recessed magnetic materials are disposed opposite to each other;
   windings are provided to each of at least one of the two magnetic pole teeth of the upper first magnetic pole tooth pair and at least one of the two magnetic pole teeth of the lower first magnetic pole tooth pair;
   a magnetic flux is formed by passing a current through the windings; and
   a direction of a magnetic flux supplied by a first winding of the windings and a direction of a magnetic flux supplied by a second winding of the windings are opposite to each other,
   wherein each of the magnetic pole teeth wound by the windings has a flat shape, and a magnetic path width of the iron core connecting portion of the inside parts is shorter than a magnetic path width of the outside parts;
   an upper second magnetic pole tooth pair provided in a longitudinal direction of the upper first magnetic pole tooth pair and connected to the upper first magnetic pole tooth pair by a magnetic material;
   a lower second magnetic pole tooth pair provided in a longitudinal direction of the lower first magnetic pole tooth pair and connected to the lower first magnetic pole tooth pair by a magnetic material;
   wherein each of the outside parts and the inside parts comprises electromagnetic steel sheets laminated in a longitudinal direction and a fixing hole penetrating in a longitudinal direction;
   each of the outside parts and the inside parts comprises an iron core connecting portion connected to an iron core extending in a vertical direction; and
   a magnetic path width of the iron core connecting portion of the inside parts has a length equal to or longer than a vertical direction of the fixing hole of the inside parts.

2. The linear motor according to claim 1, wherein the armature comprises:
   a first winding wound around each magnetic pole tooth of a part of or all of the upper and lower first magnetic pole tooth pairs; and
   a second winding wound around each magnetic pole tooth of a part of or all of the upper and lower second magnetic pole tooth pairs, and
   wherein a direction of a magnetic flux supplied by the first winding and a direction of a magnetic flux supplied by the second winding are opposite each other.

3. The linear motor according to claim 1, wherein the magnetic material comprises an electric resistance unit having a larger electric resistance value than an electric resistance value of the magnetic material along a longitudinal direction.

4. The linear motor according to claim 1, wherein the outside parts comprises a vertically extending iron core and either of or both of a projected line connecting portion and a recessed line connecting portion provided at a tip of the iron core and extending along a longitudinal direction,
   the inside parts comprises a vertically extending iron core, the other one or both of the projected line connecting portion and the recessed line connecting portion provided at a tip of the iron core and extending along a longitudinal direction, and
   the projected line connecting portion and the recessed line connecting portion can be fit each other.

5. The linear motor according to claim 1, wherein when 2n magnetic pole teeth are arranged in a vertical direction of the armature, a total number of turns of the windings wound around n magnetic pole teeth counted downward from an uppermost magnetic pole tooth and a total number of turns of the windings wound around the other n magnetic pole teeth in a vertical direction are substantially equal.

6. An apparatus mounting the linear motor according to claim 1.

* * * * *